United States Patent [19]

Tsai

[11] Patent Number: 5,636,078

[45] Date of Patent: Jun. 3, 1997

[54] TAPE RECORDING METHOD AND APPARATUS

[76] Inventor: Irving Tsai, 435 E. 70th St., Apt. 16K, New York, N.Y. 10021

[21] Appl. No.: 532,447

[22] Filed: Sep. 22, 1995

Related U.S. Application Data

[62] Division of Ser. No. 248,462, May 24, 1994, abandoned, which is a continuation of Ser. No. 796,580, Nov. 22, 1991, abandoned.

[51] Int. Cl.$^6$ .............................. G11B 5/02; G11B 15/07; G11B 23/087
[52] U.S. Cl. ............................ 360/72.1; 360/132; 360/93
[58] Field of Search ............................ 360/132, 93, 72.1, 360/71

[56] References Cited

U.S. PATENT DOCUMENTS

| | | | |
|---|---|---|---|
| 4,338,644 | 7/1982 | Staar | 360/132 |
| 4,383,285 | 5/1983 | Staar | 360/132 |
| 4,475,222 | 10/1984 | Egendorf | 360/93 |
| 4,723,181 | 2/1988 | Hikok | 360/132 |
| 4,839,875 | 6/1989 | Kuriyama et al. | 360/132 |
| 4,841,386 | 6/1989 | Schiering | 360/132 |
| 5,055,947 | 10/1991 | Satoh | 360/132 |
| 5,353,121 | 10/1994 | Young et al. | 348/563 |

FOREIGN PATENT DOCUMENTS

| | | | |
|---|---|---|---|
| 55-146667 | 11/1980 | Japan . | |
| 58-41472 | 3/1983 | Japan . | |
| 60-253079 | 12/1985 | Japan | 360/72.1 |

*Primary Examiner*—John H. Wolff
*Assistant Examiner*—Paul J. Ditmyer
*Attorney, Agent, or Firm*—Weil, Gotshal & Manges LLP

[57] ABSTRACT

A cassette recording system having both a primary memory and an auxiliary memory associated with the cassette. A mechanism is provided for sequentially reading information from and writing information to the primary memory as well as randomly reading information from and writing information to the auxiliary memory. The auxiliary memory may be used to retain programming information. The system enables a cassette to be transferred from one recorder to another, with the recording schedule, being included in the auxiliary memory associated with the cassette, being similarly transferred.

16 Claims, 20 Drawing Sheets

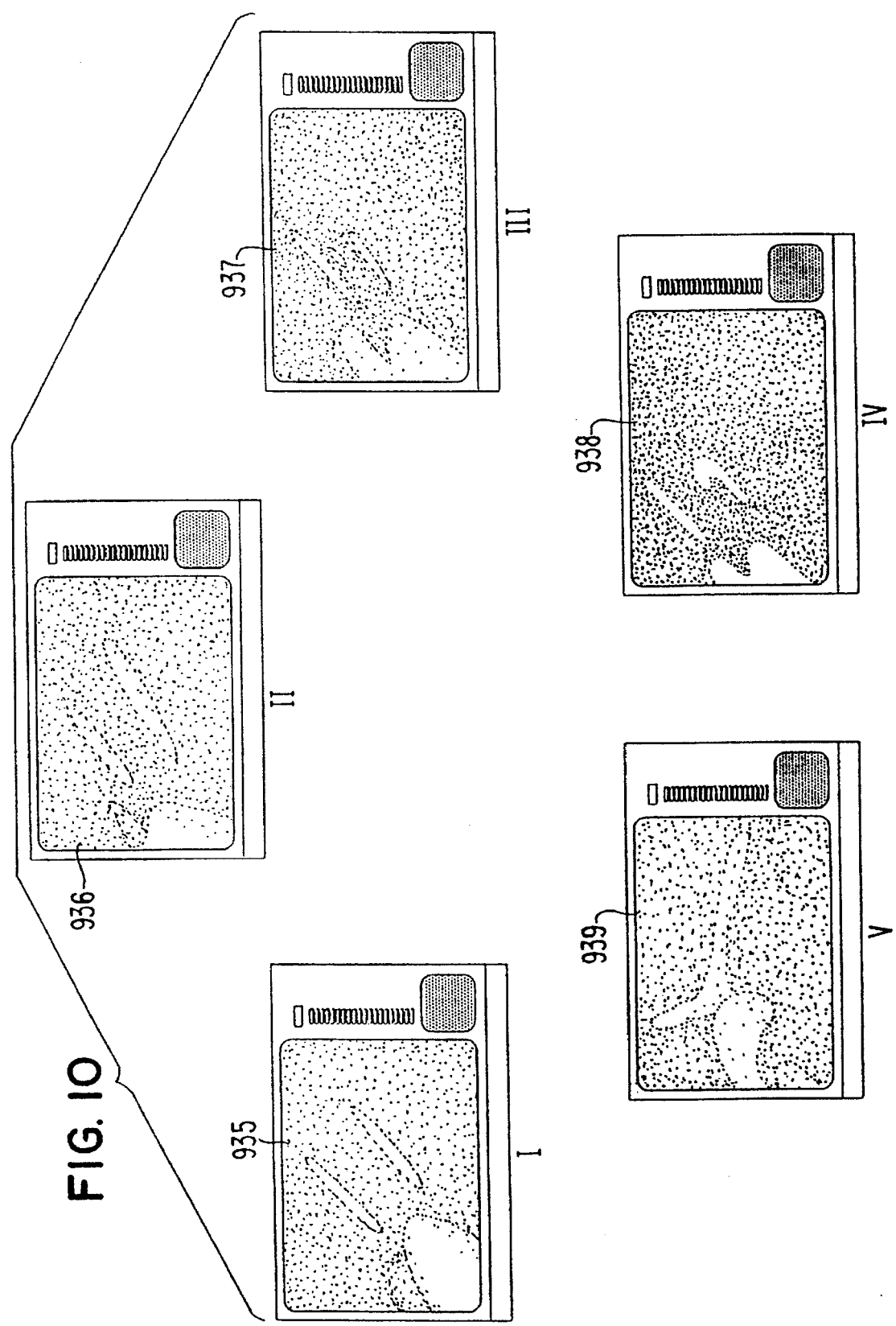

FIG. 14A
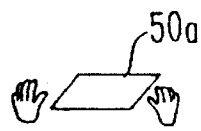
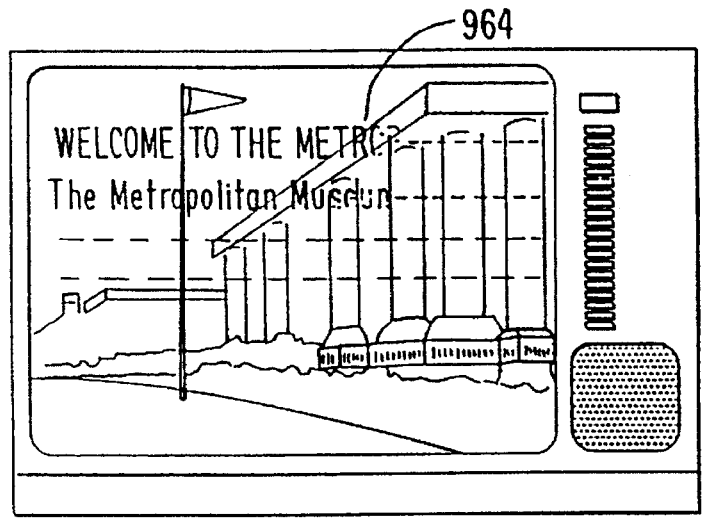
FIG. 14B
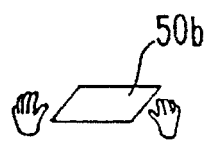
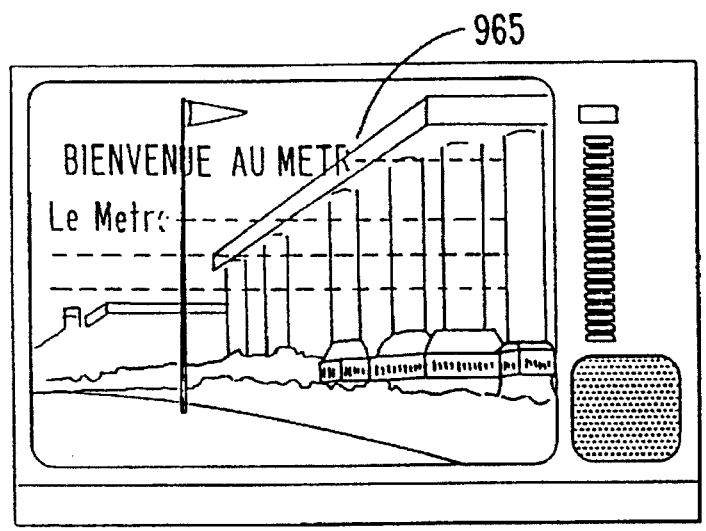
FIG. 14C
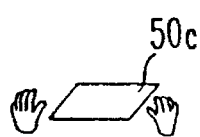
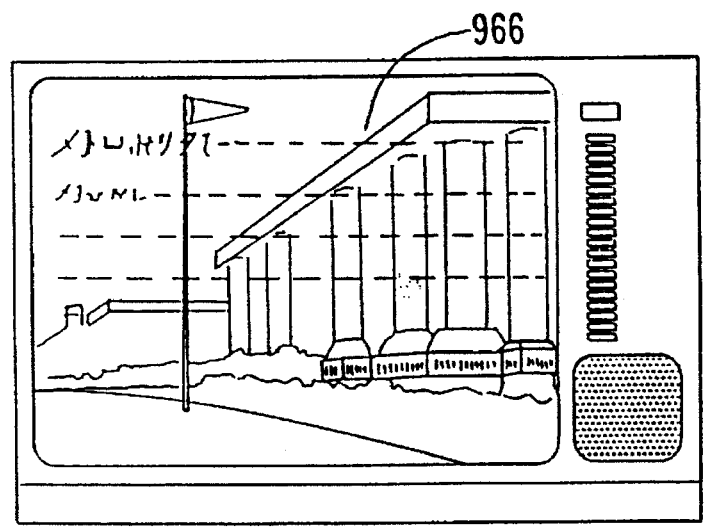

TAPE RECORDING METHOD AND APPARATUS

This is a divisional of application Ser. No. 08/248,462 filed on May 24, 1994, now abandoned which is a continuation of Ser. No. 07/796,580 filed on Nov. 22, 1991 now abandoned.

BACKGROUND OF THE INVENTION

1. Field of the Invention

The present invention relates to an improved method and apparatus for recording on cassettes. In particular, the present invention relates to an improved method and apparatus for recording on, and playing back, videocassettes.

2. Description of Related Art

Known video recorders are capable of placing "indexing" markers on a tape for later use in locating the beginning of recorded programs. To find the starting point of a program, these systems essentially play the tape while "looking out" for the earlier-recorded markers. This approach tends to be slow and subjects the tape to mechanical fatigue. Specific programs are not identified by the index markers, nor can specific programs be automatically sought by such systems. These apparatus are not capable of providing a Table of Contents displaying recorded programs, nor are they capable of furnishing the means to go to a selection chosen from such a table.

Also known are video recorders designed to be connected to special purpose hardware, such as professional editing equipment or computers. In most cases, such devices comprise ordinary professional grade video recorders that are designed to be controlled by a conventional personal computer, to which the video recorder is connected by an electrical cable. While these configurations permit more features to be implemented than ordinary video recorders, they do not improve the user friendliness of the overall system. On the contrary, they typically require the operator to be in possession of special technical skills, such as expertise in the operation of computers and proficiency in one or more computer programming languages.

Also known are ongoing efforts to improve the graphical user interface of video recording equipment, especially in the areas that relate to the "programming" of timed recordings. A variety of strategies have been suggested that make use of on-screen menus or numeric codes.

It is an object of the present invention to enhance the functional range of tape recording and playing equipment, and to simultaneously improve the user friendliness of the resultant hardware, while maintaining compatibility with prior art systems. It is a further object of the present invention to enable an array of novel functions to be implemented that are not possible or practical using presently available hardware.

SUMMARY OF THE INVENTION

In accordance with the present invention, these and other objectives are achieved by providing an improved videocassette that includes electronic data storage areas as part of the videocassette mechanism, in addition to the usual audio and video recording areas found in prior art mechanisms. The electronic data storage areas may be accessed independently of the ordinary audio and video recording areas. Typically, access to these electronic data areas will be by a random access means rather than by a sequential access means. One advantage of this is that the information stored in the these areas may be retrieved more rapidly than the information stored on the tape itself. For instance, movie credits saved in the auxiliary memory may be viewed at any time by a viewer. In sharp contrast, in current systems movie credits typically can only be seen at the end of the tape. To see the credits without screening the whole tape, a viewer presently must fast-forward the tape to the end. This process can consume considerable amounts of time.

Improved videocassettes in accordance with the present invention are operatively compatible with prior art recorders and players. An improved videocassette that is used with an ordinary, prior art recording apparatus will function identically to an ordinary, prior art videocassette. Lost, however, are the many benefits afforded by the use of the improved videocassette with the improved recording apparatus in accordance with the present invention. It is also possible for an ordinary, prior art videocassette to be used with the improved recording or playing apparatus of the present invention. Again, while this allows for prior art compatibility, none of the advantages of the present invention will be available to the user.

Additionally with respect to prior art compatibility, another advantage of the present invention is that certain embodiments permit ordinary users, who are themselves not in possession of any special technical skills, the capacity to upgrade their existing tape collection from the current art recording scheme to one that operates in accordance with, and embraces all the advantages of, the improved recording scheme taught by the present invention. Therefore, not only does the present invention assure prior art compatibility, but it also provides ordinary users with the capacity to upgrade their prior art cassette mechanisms.

The present invention is thus directed to improving tape recording and playing equipment, such as VCR's (video cassette recorders), camcorders, tape decks, DAT (digital audio tape) recorders, Walkman-type personal stereos, as well as other tape based recorders and players. The improvement may be accomplished by a two phase process: an improvement to the tape mechanism, and an improvement to the recording or playing apparatus. In the improved configuration, an array of functions that are presently not available to current art equipment may be implemented. The additional functions are intended to expand the operational range of existing equipment, while simultaneously increasing the "user-friendliness", or ease of use of the hardware.

In one embodiment of the present invention an improved cassette may be derived from a "standard" cassette that is modified by the user to enable the numerous advantages of the present invention. In another embodiment of the present invention an improved cassette mechanism may comprise a cassette that has been manufactured to operate in conjunction with an improved playing apparatus.

The present invention enables an array of appealing capabilities, heretofore unavailable, to be implemented in a convenient, prior-art-compatible, and user friendly manner.

BRIEF DESCRIPTION OF THE DRAWINGS

A detailed description of the preferred embodiments of the present invention will be made with reference to the accompanying drawings.

FIG. 10 shows two features supported by hardware in accordance with one embodiment of the present invention.

FIG. 14 shows the flexibility afforded by a removable auxiliary memory in accordance with one embodiment of the present invention.

DESCRIPTION OF THE PREFERRED EMBODIMENT

The following detailed description is of the best presently contemplated mode of carrying out the present invention. This description is not to be taken in a limiting sense, but is made merely for the purpose of illustrating the general principles of the invention. The scope of the invention is best defined by the appended claims.

Figure 1:
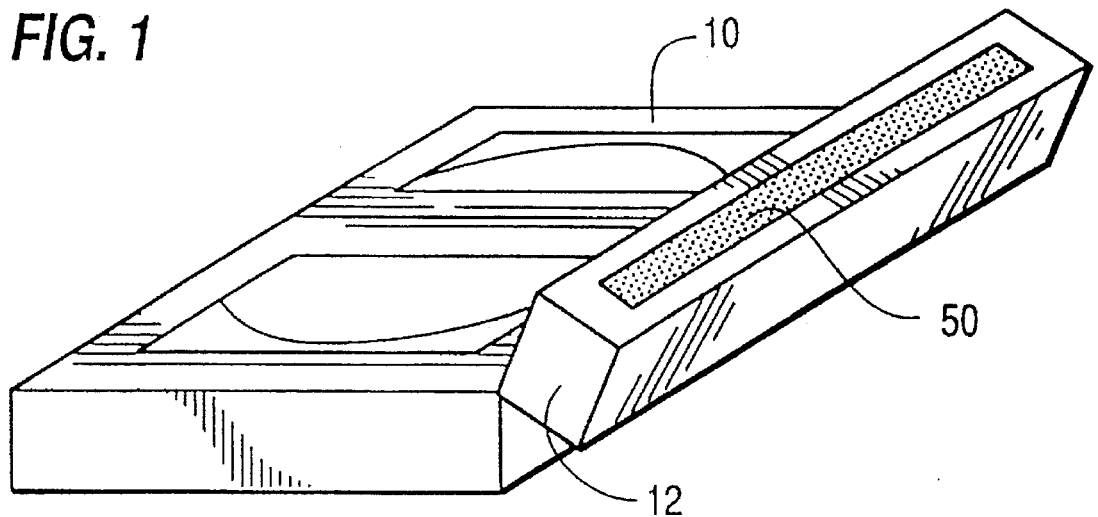
FIG. 1 shows one configuration of a videocassette in accordance with the teachings of an embodiment of the present invention.

As illustrated in FIG. 1, an improved videocassette 10 is provided in accordance with one embodiment of the present invention and includes an auxiliary memory. In the embodiment shown in FIG. 1, the auxiliary memory media is in the form of a linear strip 50 on the swing-up hood 12 of the videocassette 10. Data may be recorded on the strip 50 whenever a recording is made. The data may include, for example, the starting time and the ending time of a recorded program, the position on the video tape at which the starting point and the ending point of the recorded program occur, the channel of the recorded program, etc. The data may be recorded on the strip 50 whenever a recording is made, regardless of whether the recording is initiated manually or automatically by the VCR.

Figure 2:
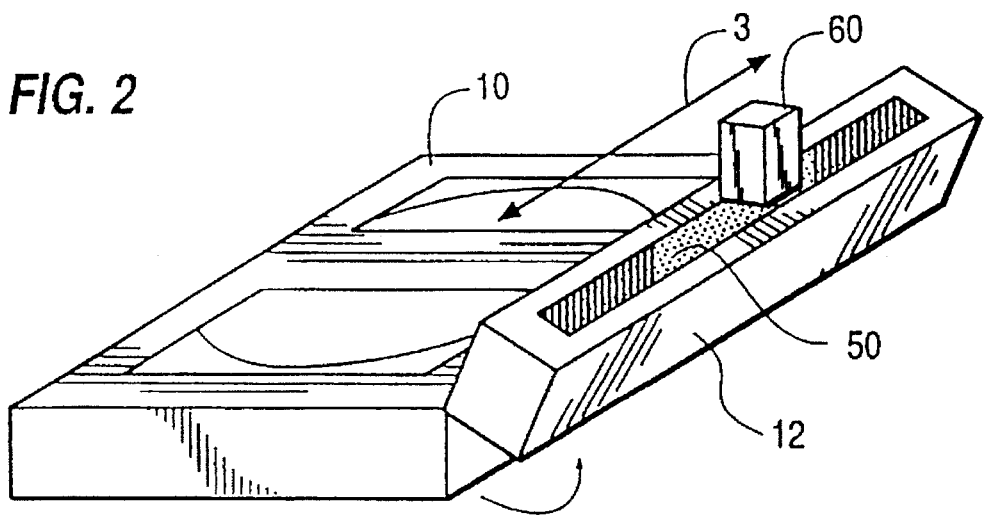
FIG. 2 shows an example of a read/write head accessing a memory strip of the videocassette of FIG. 1.
Figure 3A:
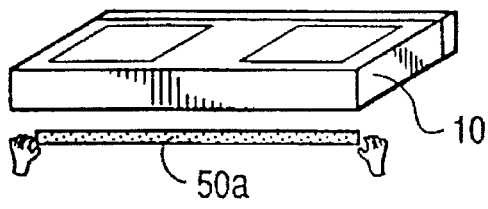
FIG. 3 shows several examples of user-applicable auxiliary memory.
Figure 3C:
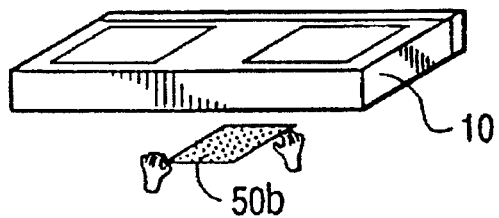
Figure 3B:
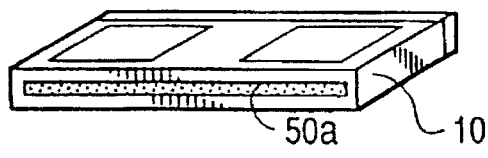
Figure 3D:
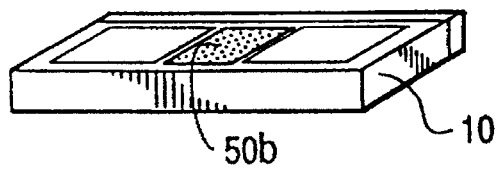

FIG. 2 illustrates an example of a read/write head 60 accessing the memory strip 50 of the videocassette 10 shown in FIG. 1. As indicated by the arrow 3, the read/write head 60 may be positioned so that it linearly tracks along the length of the strip 50. The strip 50 may be located on the swing-up hood 12 of the videocassette 10. While the location of the strip 50 on the swing-up hood 12 of the videocassette 10 is not a requirement of the present invention, it does place the auxiliary memory 50 at a relatively maximum distance from the magnetic tape within the videocassette 10. Moreover, it leaves available other locations on the exterior of the videocassette 10 which may be used for the placement of conventional adhesive labels.

FIG. 3 illustrates several examples of user-applicable auxiliary memory media 50, as well as several potential locations for the placement of such auxiliary memory media 50 on the videocassette 10. The auxiliary memory media 50 may be applied virtually anywhere on the videocassette 10. The auxiliary memory media 50 may assume any convenient geometric shape 50a, 50b. Further, the auxiliary memory media 50 may be optically based, magnetically based, semiconductor based, etc., or any combination of these.

Because the auxiliary media of the present invention may be user applicable, ordinary individuals are provided with the capacity to convert prior art cassette mechanisms into cassette mechanisms that can make use of the advanced features of the present invention. Further, because the auxiliary media of the present invention may be applied by ordinary users to prior art cassette mechanisms, the present invention does not require the introduction of yet another recording format to the already confusing medley of formats now available to consumers. Thus, the present invention teaches a technique of expanding the operational range of tape recording equipment beyond that of the current art, without necessitating the wholesale abandonment of the current art cassette format. Old recordings made on standard cassettes with prior art equipment may be played on equipment that has been constructed in accordance with the present invention. New recordings made on cassettes and equipment constructed in accordance with the present invention may be played on standard prior art equipment, although without access to the enhanced features enabled by the present invention. In addition, standard prior art cassette mechanisms may be upgraded for use in accordance with the present invention by ordinary users, unskilled in the technical arts.

Figure 4:
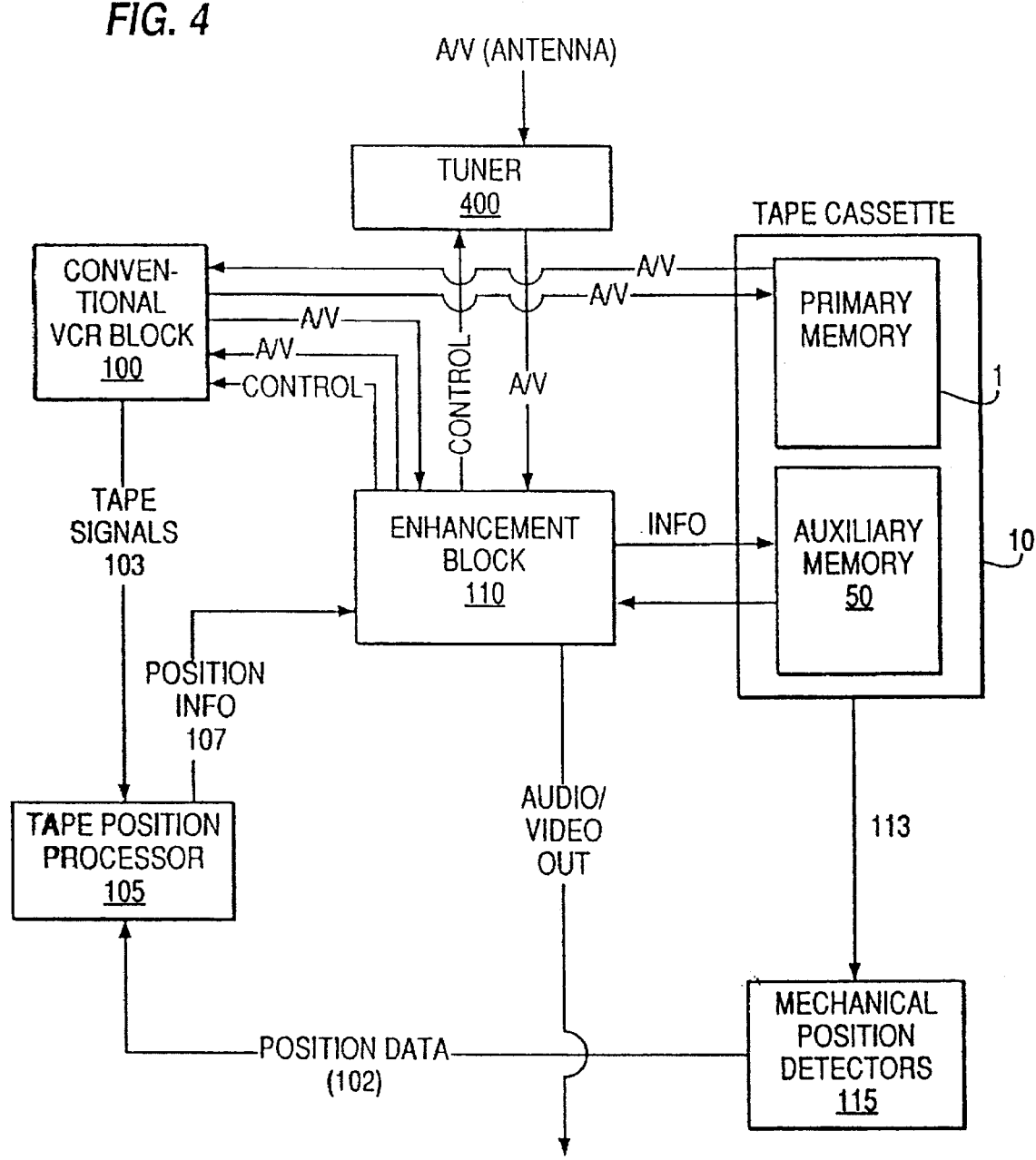
FIG. 4 shows an organizational diagram for an embodiment of the present invention.

FIG. 4 is an organizational diagram that illustrates the information flow between various components in accordance with one embodiment of the present invention. The block referred to in FIG. 4 as the "Conventional VCR Block" 100 includes hardware that is generally found in current video cassette recorders. The "Conventional VCR Block" 100 thus furnishes the means to read from, and to write to, conventional video cassette tapes. The block referred to in FIG. 4 as the "Enhancement Block" 110 includes hardware that is useful in facilitating several of the enhanced features in accordance with an embodiment of the present invention.

Figure 5:
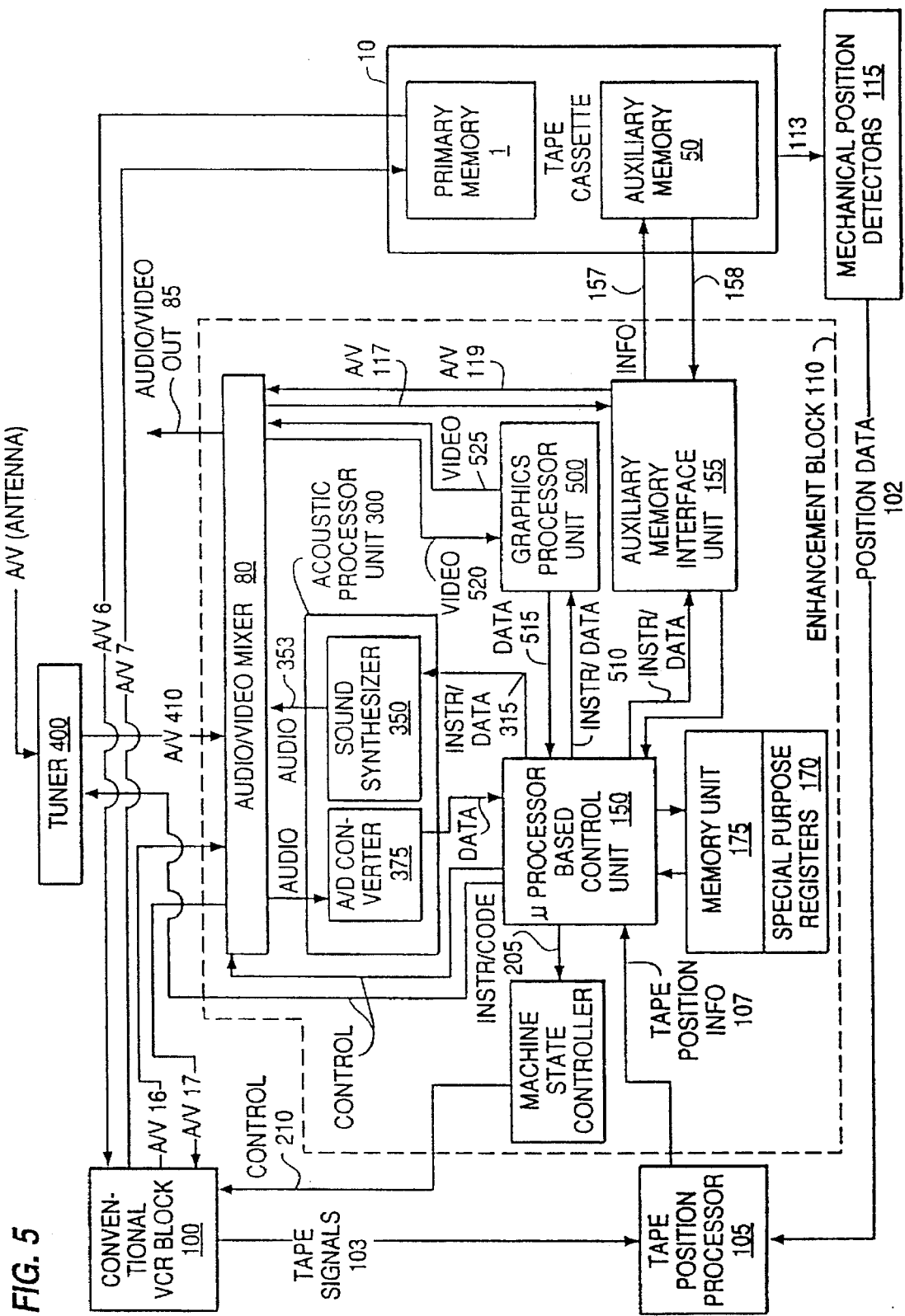
FIG. 5 shows an organizational diagram of the enhancement block.

A more detailed organizational diagram of the Enhancement Block 110 is furnished in FIG. 5. As shown in FIG. 5, the Enhancement Block 110 may include a microprocessor based logic unit 150 as well as a peripheral storage device controller and interface unit 155.

FIGS. 4 and 5 further illustrate a functional block referred to as the "Tape Position Processor" 105. The Tape Position Processor 105 provides information about the "position" of the audio/video read/write heads on the tape (the tape is referred to in FIGS. 4 and 5 as the "Primary Memory" 1). The term "position" is used herein to refer to the physical location of the heads relative to the tape at any given instant (for example, the physical location of the heads relative to the beginning of the tape reel).

There are various techniques for keeping track of position. Some of these techniques are more accurate than others. For example, some of the more familiar methods include Control Track Pulse counting, Longitudinal Time Coding, and Vertical Interval Time Coding. To make use of such techniques, the Tape Position Processor 105 preferably has access to the tape signals 103 where the time code resides. While time-coding is typically frame accurate, it is often sufficient to determine approximate tape positions such as by mechanical/physical means 115. A mechanical counter may be employed as part of the cassette mechanism to count the revolutions of the tape reel. Similarly, mechanical metering means may be employed to measure the tape as it travels from the source to the take-up reel. Alternatively, the angular velocity of the reel may be monitored and compared to known reference rates at different tape positions. In any event, the physical measurements 113 taken by the Position Detectors 115 preferably provide data 102 which may be used by the Tape Position Processor 105 to supply position information 107 to the Enhancement Block 110. It is also possible to employ a combination of position determination techniques, such as using mechanical means to first approximate the position, and then using "software" means (such as time code or index markers) to more precisely ascertain position. These methods and considerations are familiar to video engineers.

The auxiliary memory 50 is intended to serve as a storage location that is capable of supplementing the primary memory 1. Virtually any kind of information that may be retained by a memory medium may be placed in the auxiliary memory 50. Generally, the most pertinent type of information with respect to a videocassette apparatus will be program identification data. Program identification data may include, for example, such information as the date and time of a recorded program, the channel, the position on the tape at which the program is located, etc. VCR's generally possess real-time-clocks, as these are usually necessary for timed recordings to be made. VCR's also generally possess tuners, as these are usually required to derive the audio/video input signals to be recorded.

Referring to FIG. 5, when a tape recording is made in accordance with the illustrated embodiment of the present invention, the contents of a set of semiconductor memory registers 170 (typically containing data such as the present date, present time, present channel, present tape position, etc.) are placed into the Auxiliary Memory 50 by way of a write operation, similar to a disk-write operation performed by a computer. However, in the preferred embodiment of the present invention, the peripheral I/O device, rather than being a disk drive, is the secondary storage medium provided by the cassette in the form of the Auxiliary Memory 50 (which may be of magnetic media, optical media, semiconductor media, etc.). Similarly, an interface unit 155 (which is comparable to a computer storage device interface unit) writes information to and reads information from the Auxiliary memory 50 (as indicated by the arrows respectively designated by the numbers 157 and 158 in FIG. 5). Upon completion of a recording, the data file corresponding to the just-recorded program may be re-opened and a set of completion parameters that may include the ending-tape-position, end-date, end-time, etc., may be saved. When title information or comments or other data are available they too may be saved (regardless of whether they originate from the signal source, audio subcarriers, a keyboard, or another input device). Some embodiments of the present invention may also be capable of placing analog audio and video information into the auxiliary memory 50. Such embodiments may make use of A/V lines 117 and 119 for line input and output, respectively, to and from the interface unit 155. The specific hardware and encoding scheme used to place data into the auxiliary memory 50 will depend on the type of media employed for the auxiliary memory. Such techniques are well within the abilities of the skilled artisan.

Similarly, when a cassette is inserted into a cassette player in accordance with the present invention, a directory area of the auxiliary memory 50 may be read to determine the collection and sequence of programs recorded on the cassette. The accessed cassette program data may be placed into semiconductor memory 175 where it may be more easily manipulated. The microprocessor based logic unit, under the control of instruction code stored in ROM, may generate a Table of Contents using program data placed earlier in RAM. As the starting and ending tape positions of the various tape resident programs is known, the apparatus is capable of finding any program present on the tape. Furthermore, because the microprocessor based logic unit 150 controls the operation of the Conventional VCR Block 100 via instruction code 205 sent to machine state controller 200, as well as manages the Device User Interface, programs may be selected from the Table of Contents and the logic unit will handle the actual mechanics of locating and playing the selected program. The specific implementation of such techniques will be apparent to the skilled artisan.

As shown in FIG. 5 with respect to a preferred embodiment of the present invention, a rather sizable array of functional possibilities may be afforded by the present invention. For example, synthetic voice-overs may be added to existing tape sound tracks. This may be accomplished by having the control unit send instructions and data to the sound synthesizer 350 of the Acoustic Processor Unit 300 (which may include DSP circuitry). The Sound Synthesizer may output a synthetic voice audio signal to the A/V Mixer 80. This synthetic voice "sound track" may subsequently be mixed by the A/V Mixer 80 with audio signals emanating from a variety of other sources. It may, for instance, be merged with audio signals coming from a Tuner 400 through line 410. Or, it may be blended with an audio track that may be coming from a tape. Or still, it may be combined with a sound track coming from the Auxiliary memory 50. Or, the original synthetic voice sound track may have had as its origin a "script" that was resident in the Auxiliary memory 50. As is known in the art, such "scripts" may be comprised of phonemes or even of ordinary words, etc. Whether individually or in combination, the audio signals mentioned above may be output by the apparatus through line 85 for reception on a television or stereo receiver. Alternatively, they may be recorded onto the tape via pathways 17 and 7. Finally, whereas the illustrative case just presented utilized a synthetic voice as an example, it may be equally possible to furnish synthesized music, or sound effects, or analog audio, etc.

In an analogous fashion to the example above, the Graphics Processor Unit 500 may be capable of generating information that may be combined in the A/V Mixer 80. The Graphics Processor Unit 500 may be used to generate text information, for example. Tables of Contents, Menus, Information Screens, etc. are all examples of text information that make use of character generator functions. Instructions and data from the Control Unit 150 may govern the content and format of the Graphics Unit output. The output video signal 525 may be furnished to the A/V Mixer 80. Video information coming from the Tuner 400 or from the tape via lines 6 and 16 may be combined with the output video signal 525 in the mixer 80 before it is output to a monitor. Suitably mixed information may also be recorded on the tape. Furthermore, whereas text may be the most common form of information to be merged with conventional video signals, it may be nonetheless possible to combine graphics such as computer animations, or other special effects.

Figure 6:
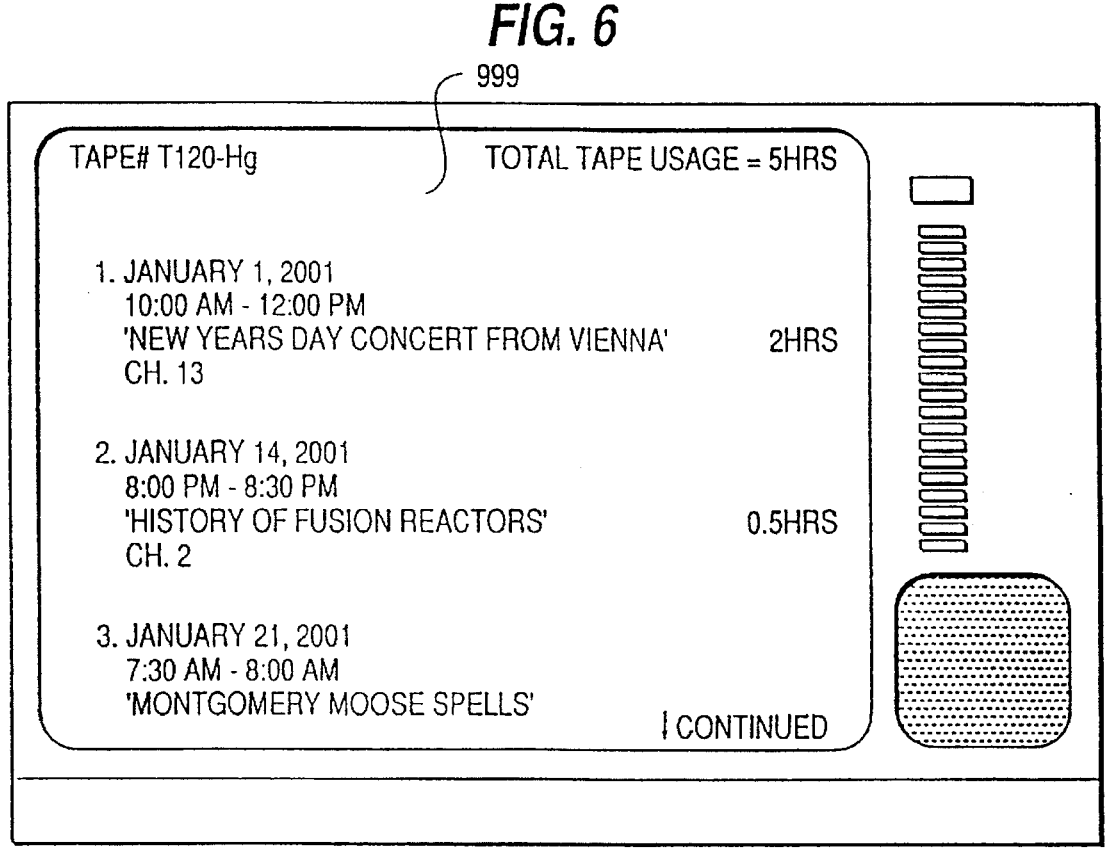
FIG. 6 shows an example of a possible "Table of Contents" screen that may be displayed on a video monitor in accordance with one embodiment of the present invention.

FIG. 6 illustrates an example of one of the many possible "Table of Contents" screens that may be displayed on a video monitor 999 when a videocassette is inserted into a VCR in accordance with one embodiment of the present invention. As shown in FIG. 6, a listing may be displayed on the screen of the video monitor showing all of the programs recorded on the videocassette. If the listing is too lengthy to be displayed on a single screen, the viewer may be alerted that the listing is "continued" on subsequent screens. The date and time when the program was recorded, as well as the original ending time of the program, may also be displayed. The signal source of the recorded program (that is, whether the source of the recorded program was a broadcast channel, a line input, a camcorder, etc.) may also be displayed. The program title, program length, and any other pertinent information may optionally be displayed. Tape consumption statistics may also be presented to the viewer, as well as information regarding the type of tape on which the programs are recorded (such information might be supplied in the auxiliary memory by the tape manufacturer). Until broadcast or program scheduling technologies improve, however, it will be recognized that some of the information mentioned above, such as titles, may require the user to make entries using a keyboard or other input device. Eventually, it is foreseen that increased amounts of "on-line" descriptive information will be made available by any of a wide variety of methods (including, for example, co-broadcast signals, use of audio subcarriers, down-loading from telephonic or cable services, disposable published data sheets, etc.).

FIG. 7 depicts an example of a "Go To Program by Title" capability of a VCR 1000 in accordance with one embodiment of the present invention. The screen 999 of the video monitor displays a video tape program listing 970. The viewer may select a program to be viewed by visually highlighting or "framing" 980 the program displayed on the screen of the video monitor. Highlighting a program from the listing of programs displayed on the screen may be executed via controls located either at the VCR 1000 or on a remote control unit 1010, as illustrated in FIG. 7. After a displayed program has been highlighted, the viewer may then depress a Go To button 1050 on the remote control unit 1010 or on the VCR 1000. The VCR 1000 will then advance the video tape to the selected program.

The "Go To Program by Title" capability of the present invention thereby allows a viewer to go to a recorded program by selecting that program from among a list of programs displayed on an on-screen Table of Contents. The "Go To Program by Title" capability of the present invention may therefore be distinguished from the "indexing" capability of some prior art VCR's. While some prior art VCR's are capable of indexing recorded programs and are capable of seeking index markers on the video tape, such prior art units are not capable of allowing a viewer to go to a recorded program by selecting that program from an on-screen Table of Contents.

The video monitor screen 999 illustrated at the bottom of FIG. 7 depicts a program that the viewer has selected and that the VCR 1000 has advanced to. After the selected program has been viewed, the VCR 1000 may either continue to play the next linearly resident program on the video tape, or it may automatically stop, or it may play a subsequent recorded program that has been selected by the viewer. The viewer may select a series of recorded programs to be viewed, in any sequence. A VCR in accordance with the present invention is capable of automatically playing the selected programs in the order specified by the viewer. In another embodiment, pre-programmed intermissions may be supplied whereby a VCR may automatically seek the next selected program in the sequence after completion of the current program, but does not play the selected program until a "Continue" command is entered by the viewer.

Figure 8A:
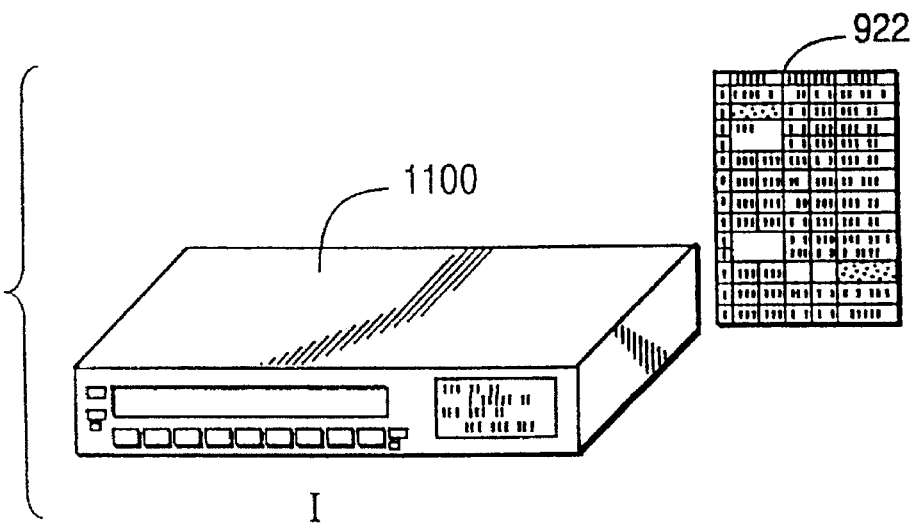
FIG. 8 shows an example of a "Portable Agenda" capability in accordance with one embodiment of the present invention.
Figure 8B:
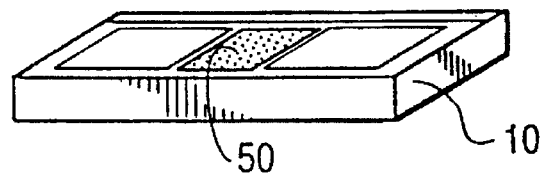
Figure 8C:
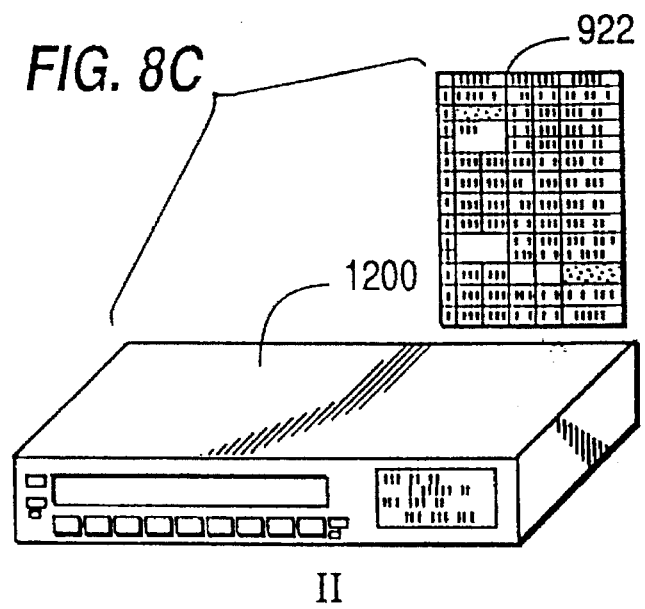
Figure 9A:
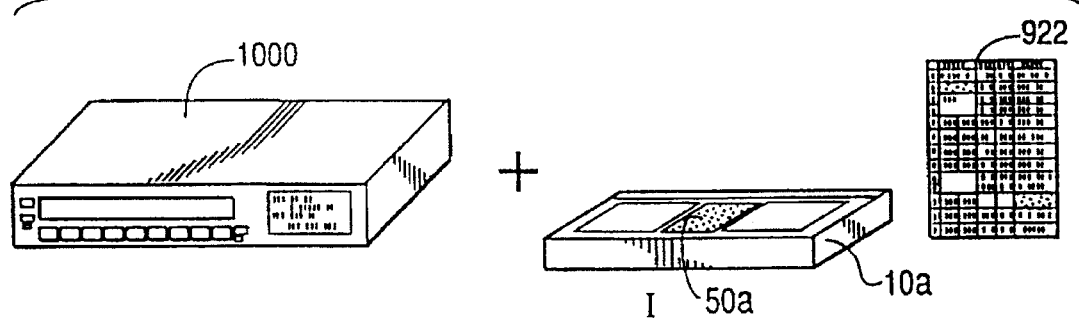
FIG. 9 shows an example of the transfer of information stored in the auxiliary memory of one videocassette to the auxiliary memory of another videocassette in accordance with one embodiment of the present invention.
Figure 9B:
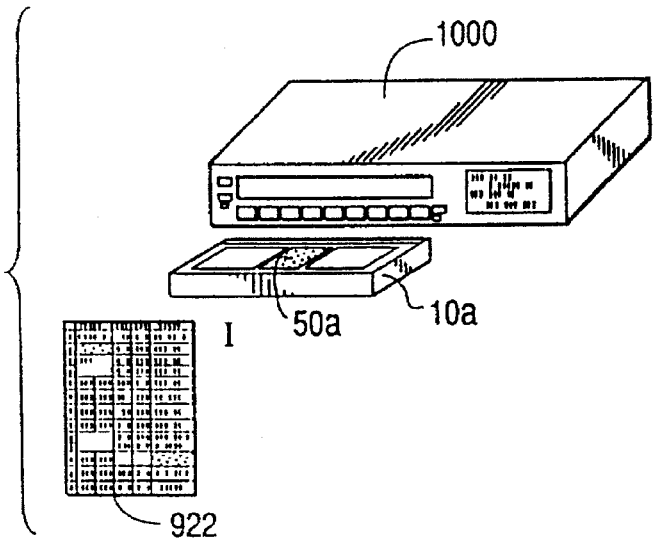
Figure 9C:
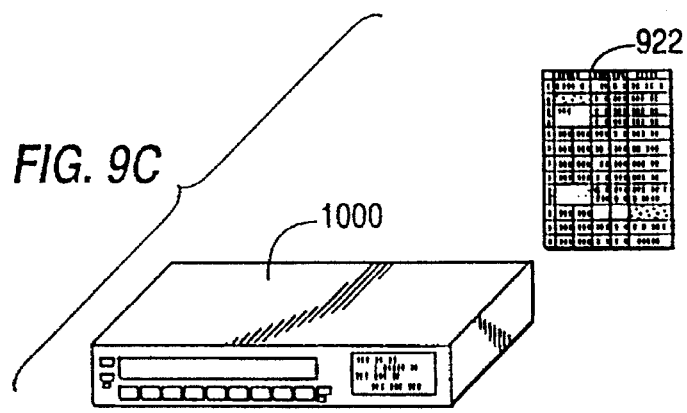
Figure 9D:
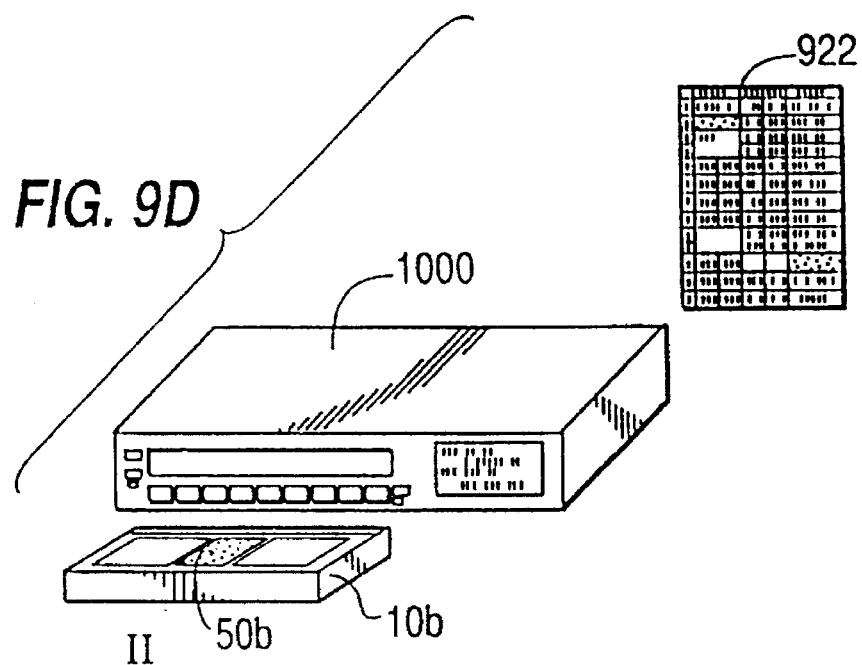
Figure 9E:
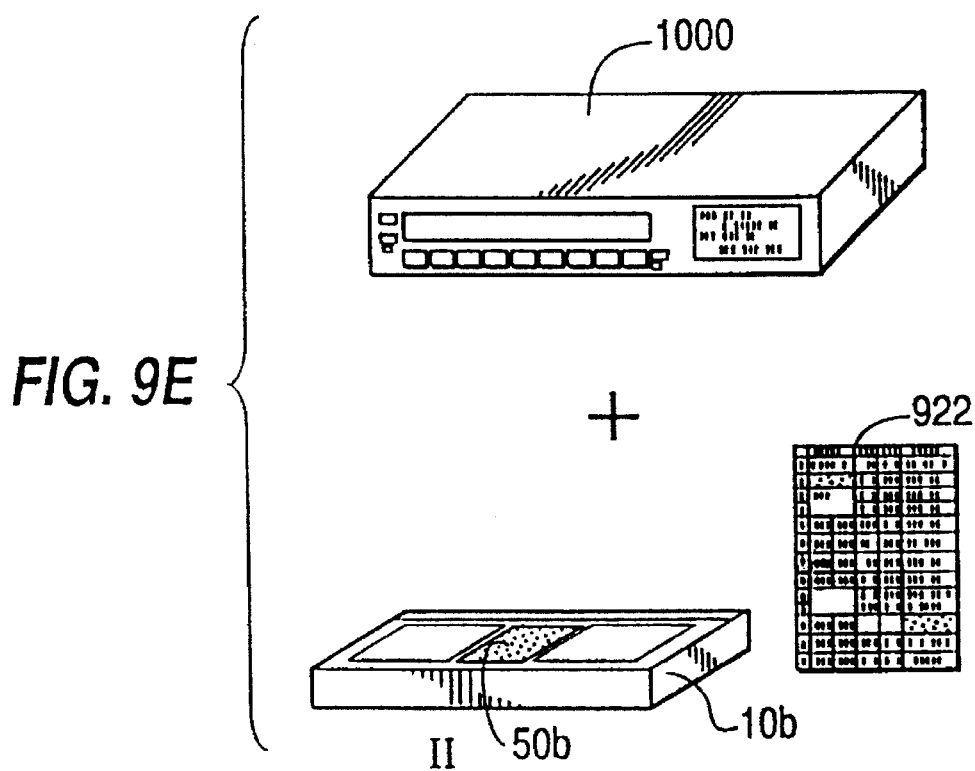

FIG. 8 illustrates the "Portable Agenda" capability of one embodiment of the present invention. The "Portable Agenda" capability enables a taping schedule or "recording agenda" of programs that have been programmed into one VCR to be transferred to one or more other VCR's without the need to manually reprogram the other VCR's. In one embodiment of the present invention, an auxiliary memory of a videocassette may be used as the means for communicating the recording agenda of a first VCR to one or more other VCR's into which the videocassette may be inserted.

FIG. 8 illustrates a first VCR 1100 and a second VCR 1200. The "Portable Agenda" capability of the present invention does not require the two VCR's to be electrically connected to each other. Nor does the "Portable Agenda" capability of the present invention require the two VCR's to be in signal communication with one another other. The set of programs that the user wishes to record may be transferred from the internal program memory of the first VCR 1100 to an auxiliary memory 50 of a videocassette 10. Upon transfer, the videocassette 10 retains information about the list 922 of programs to be recorded in a Recording-Agenda file in the auxiliary memory 50. A "Load Program From Video tape" function may be used to extract the recording schedule from the videocassette 10, thereby permitting a "Recording Agenda" to follow a video tape from one VCR to another without the need for re-programming. The VCR may have a "record from VCR" mode and a "record from video tape" mode. The VCR may also have an "Agenda Append" feature that allows programs appearing on different video tapes or in other machines to be added to the VCR's internal memory. Unwanted programs can be deleted from any agenda. Any information capable of being placed in the auxiliary memory 50 of a videocassette 10 may likewise be made portable.

FIG. 9 illustrates a procedure for transferring information stored in the auxiliary memory 50*a* of one videocassette 10*a* to the auxiliary memory 50*b* of a second videocassette 10*b*. In the example shown in FIG. 9, the transferred information consists of a recording agenda 922, although the illustrated process may be applicable to the transfer of virtually any type of information contained in the auxiliary memory. The single VCR 1000 present in FIG. 9 serves as an intermediary in the transfer. The first videocassette 10*a* may be loaded into the VCR 1000. The recording agenda 922 of the first videocassette 10*a* may be recorded and stored by the VCR 1000. The first videocassette 10*a* may be then removed from the VCR 1000 and the second videocassette 10b (which may be a new, blank videocassette) may be subsequently loaded into the same VCR 1000. The recording agenda 922 of the first videocassette 10a may be then duplicated by the VCR 1000 onto the auxiliary memory 50b of the second videocassette 10b. The present invention thereby enables a recording agenda to be transferred from one videocassette to another videocassette without requiring any recording to be performed on the video tape, with a VCR serving only as an intermediary. Any information that may be placed into an auxiliary memory can be transferred between videocassettes in this manner.

FIG. 10 illustrates two features supported by one embodiment of the present invention.

The first feature illustrated in FIG. 10 is the ability to define and automatically playback one or more segments of the video tape as a repetitive "loop". A starting point or a starting frame 935 for the video tape loop may be effectively tagged on the video tape by means of recording the starting position, or frame, in an auxiliary memory in a "Loop-File". As used herein, the term "Loop-Files" refers to file entities similar in most respects to Recorded-Program-Files. Whereas a recorded-program-file contains information about the starting and ending tape positions of a recorded program, a loop-file contains information about the starting and ending tape positions of a loop segment. Loop-Files, however, will more frequently also include instruction code which may be used to control the machine state controller 200. These are the instruction codes used by the microprocessor based control unit to place the apparatus into a "play state", "rewind state", etc. An ending point or an ending frame 939 for the loop may be tagged on the video tape in a manner similar to tagging the starting point. When the user sees the point in the tape that is to be the end of the loop, a loop-end command may be executed and the tape position or frame at that location may be recorded in the loop-file. If a videocassette that has been so tagged is inserted into the VCR, then the VCR will repeatedly play the designated loop segment. The loop segment may be played repeatedly at either a normal speed, or at a reduced or increased speed. This feature may be useful in a number of applications, such as scientific investigations, court room illustrations, and the like. Other information about the loop segment (i.e., length, title, etc.) may also be retained in a loop-file in an auxiliary memory. Specific loop segment playback guidelines may also be selected and retained in an auxiliary memory. Normal speed playback, slow motion playback, freeze frame with frame-by-frame advance, or any combination of these may be automatically executed on playback, without requiring the sustained presence of an operator. A loop count can be taken so that loop playback will terminate after a pre-designated number of cycles. Loop termination criteria may also be included in the loop-file as part of the loop-definition. Furthermore, because a single cassette may contain a number of loop-segments, a user may select for viewing any of the loop segments present from an on-screen Table of Contents, in a manner similar to that for selecting an ordinary recorded program. This may be easily accomplished since loop-files, as file entities, may be treated similarly to program-files.

A second feature illustrated by FIG. 10 is the capability of a preferred embodiment of the present invention to perform "Frame Retrieval". Specific frames, 935–939, of a recorded video tape sequence may be tagged by a viewer. This may be done by viewing the recorded video tape on a video monitor and activating a "Tag Frame" command on either the remote control unit or on the VCR when the specific frame appears on the video monitor screen. Information identifying the location on the video tape of the tagged frame may then be recorded in an auxiliary memory. A "Frame Retrieval" function may be initiated when a videocassette containing the tagged frame is inserted into a VCR. The VCR may then read the auxiliary memory for the stored information identifying the location of each tagged frame on the video tape and may then advance the video tape to that location. When the tagged frame is located, the frame may be "played" into a digital frame buffer where it may be retained. The viewer may thereby flip through a sequence of frames at the viewer's own pace, in either forward or reverse action mode. In cost-saving embodiments of the invention this frame retrieval feature may be implemented without digital frame buffers. However, the freeze frame display of single images may be less stable without the use of such buffers, and damage to the video tape may occur if a frame is frozen for an extended period. Additionally, features such as zoom-in and image enhancement are more difficult to implement in the absence of such buffers.

Figure 11A:
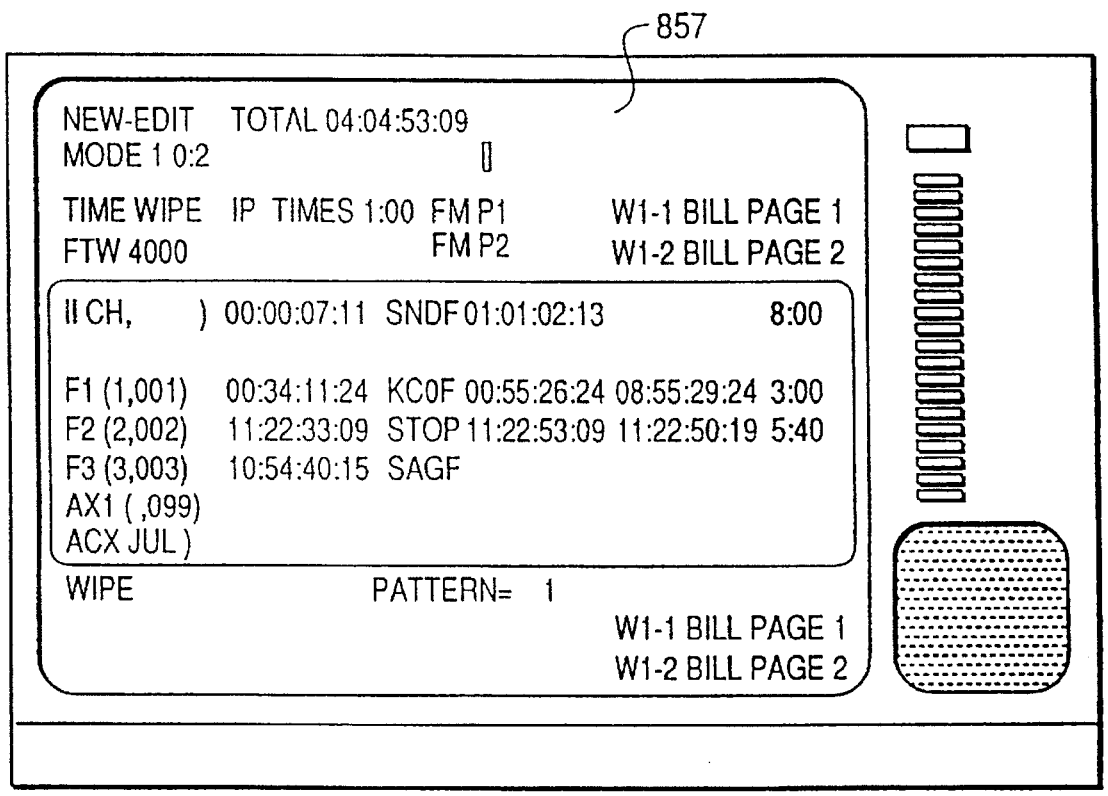
FIG. 11 shows an example of sophisticated video tape editing capabilities in accordance with one embodiment of the present invention.
Figure 11B:
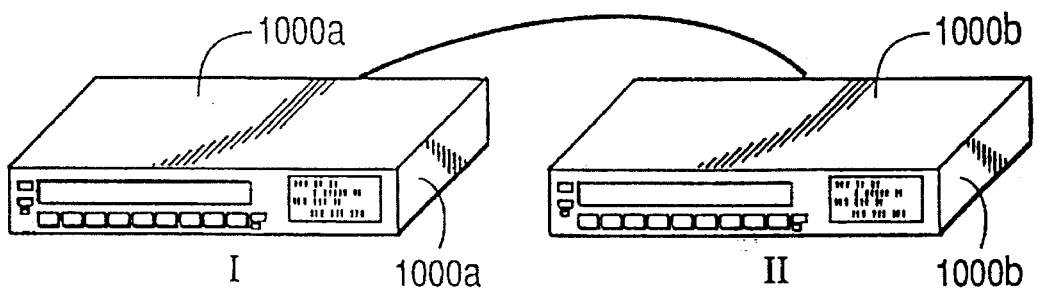

FIG. 11 illustrates the sophisticated video tape editing capabilities of an embodiment of the present invention. A program recorded on a video tape may be edited using professional editing equipment (not shown) and the editing commands 857 may be stored in an auxiliary memory. It may be also possible for a "Carbon Copy" feature to be implemented, in which the editing commands are automatically saved. The editing commands may be archived for future reference, or they may be used to edit another copy of the same original, in such manner that portions of the second edited footage are identical to the first edited footage, while other portions are different. Identical edits may be executed under automated control.

FIG. 11 also illustrates amateur level editing. A first VCR 1000a may be electrically connected to a second VCR 1000b. The first VCR 1000a plays back a pre-selected series of recorded programs. The second VCR 1000b simultaneously records the programs being played back by the first VCR 1000a. The first VCR 1000a may play back the recorded programs in normal time mode, or it may play back the recorded programs in a fast or slow motion mode, or it may play back the recorded programs one frame at a time in accordance with a pre-programmed scheme, or it may play back loop-segments of the recorded programs. If the second VCR 1000b records in normal time mode, then a video tape recorded by the second VCR 1000b will contain all of the special effects of the first video tape routine in normal time mode. Auto-splice duplication of jump-recorded programs, and of programs containing unwanted insertions can be performed. Duplications may be programmed to occur at a convenient hour, such as when the machine is known to be idle.

FIG. 12 illustrates an embodiment of the present invention in which an auxiliary memory 50 may be removably mounted onto a videocassette 10. A retainer, sleeve, or mounting frame 173 may first be applied to the videocassette 10. The auxiliary memory 50 may then be inserted into the retainer, sleeve or mounting frame. The auxiliary memory 50 may also be supplied with a "reversible" adhesive backing, such as those used with Post-It Notes made by 3M.

Figure 12A:
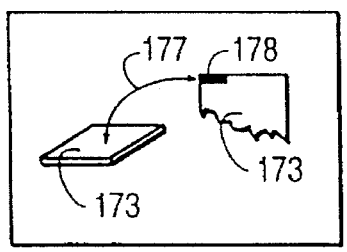
FIGS. 12A–12F shows an embodiment of the present invention in which an auxiliary memory is removably mounted onto a videocassette.
Figure 12B:
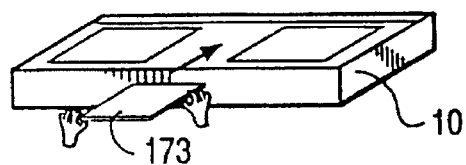
Figure 12C:
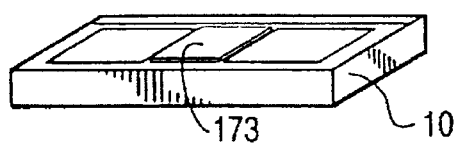
Figure 12D:
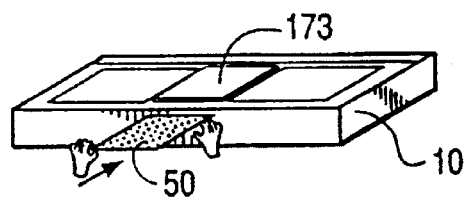
Figure 12E:
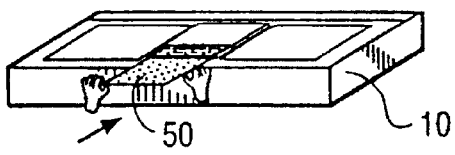
Figure 12F:
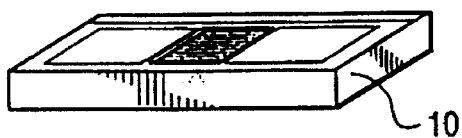
Figure 13A:
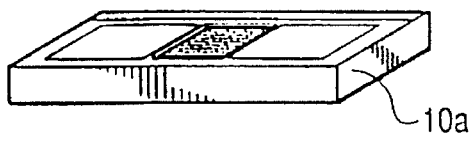
FIG. 13 shows a user removing an auxiliary memory from one videocassette and inserting it into another videocassette in accordance with one embodiment of the present invention.
Figure 13D:
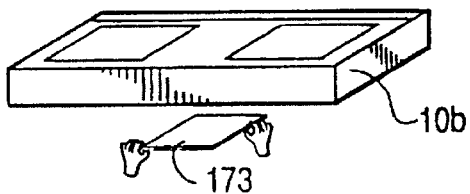
Figure 13B:
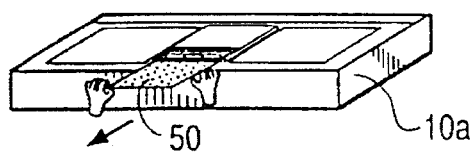
Figure 13E:
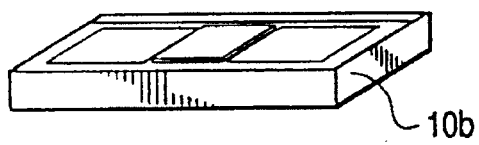
Figure 13C:
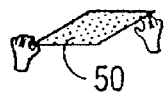
Figure 13F:
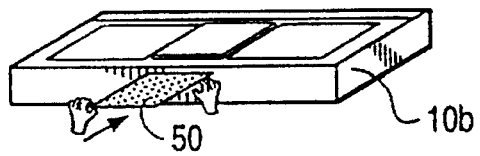
Figure 13G:
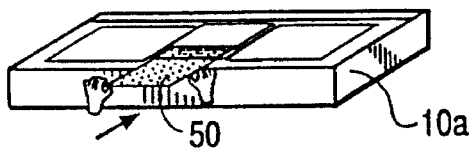
Figure 13H:
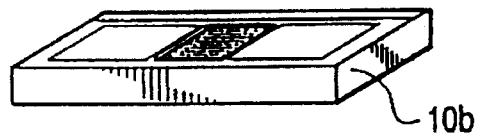

FIG. 12A depicts an embodiment of a retainer. Arrow 177 indicates a region on the retainer 173 in which a "coordination memory area" 178 may be located. A function of the coordination memory area is to store a code that may be used to determine whether the removable auxiliary memory 50 has been separated from the videocassette 10 after a program has been recorded on the videocassette 10. Such a coordination memory area may be desirable when the auxiliary memory 50 is of the removable variety, so that program table of contents information may be coordinated with programs that are actually recorded on the video tape. This coordination may be accomplished by recording the same code in the auxiliary memory 50 as in the coordination memory area. The VCR may be equipped with a means for reading and comparing the codes written in the auxiliary memory 50 and the coordination memory area. When the codes written in the two areas do not match, the VCR may then warn the user that table of contents data may not correspond to the video data on the video tape and that program information may consequently be destroyed by initiating a recording sequence. Recording agenda information, as well as other instructions or data not specifically associated with the video tape program data, will continue to function.

While an auxiliary memory of the removable variety may be present alone on a videocassette, it may be preferred that an auxiliary memory of the removable variety be used as a supplement to an auxiliary memory of the non-removable variety. When this is the case, the coordination code may be stored in the non-removable auxiliary memory instead of in the coordination memory area of the retainer. Although FIG. 12A illustrates a coordination memory area being located at one corner of a retainer, the coordination memory may be located anywhere that is convenient on the videocassette without deviating from the concept of the invention.

FIG. 13 depicts a user removing an auxiliary memory 50 from a first videocassette 10a and inserting the auxiliary memory into a second videocassette 10b. The second videocassette 10b may contain a blank video tape and may first require the application of a retainer 173. Information such as the recording agenda may be transferred from the first videocassette 10a to the second videocassette 10b by transferring the auxiliary memory 50 from the first videocassette 10a to the second videocassette 10b.

FIG. 14 illustrates an example of the flexibility afforded by a removable auxiliary memory. FIG. 14 illustrates a single videocassette 10 having a user selectable multi-lingual program recorded in an auxiliary memory 50. Caption information in each of several languages may be recorded in the auxiliary memory: 50a, 50b, 50c, along with information allowing for proper coordination of the captions with their intended frames. Different language captions: 964, 965, 966 may be generated without the translator ever watching the video taped program. Furthermore, as computer language translation technologies improve, along with voice recognition techniques, it may be possible to incorporate multi-lingual captions created by computer translators. For instance, audio information may be digitized by an A/D convertor for presentation to the computational hardware and software. The computational hardware and software need not be supplied by the apparatus itself, but instead may be furnished by an external unit or by a plug-in, advanced function module. Still further, it may be possible to place actual voice sound tracks in an auxiliary memory so that the same video tape may be reversibly and changeably dubbed.

Messages of virtually any nature may be recorded in an auxiliary memory. For example, a video tape containing a Shakespeare play might include an automated intermission between scenes where explanations are provided. This might be in addition to captions appearing at the bottom of the screen in modern English. Furthermore, the present invention makes it possible for an instructor to generate the aforementioned captions and explanatory material. It is no longer necessary for an instructor to be at the mercy of video production companies to create the precise kind of programming he or she desires for the class. Also, Copyright notices accompanying pre-recorded material can conveniently be handled by the present invention.

Figure 15:
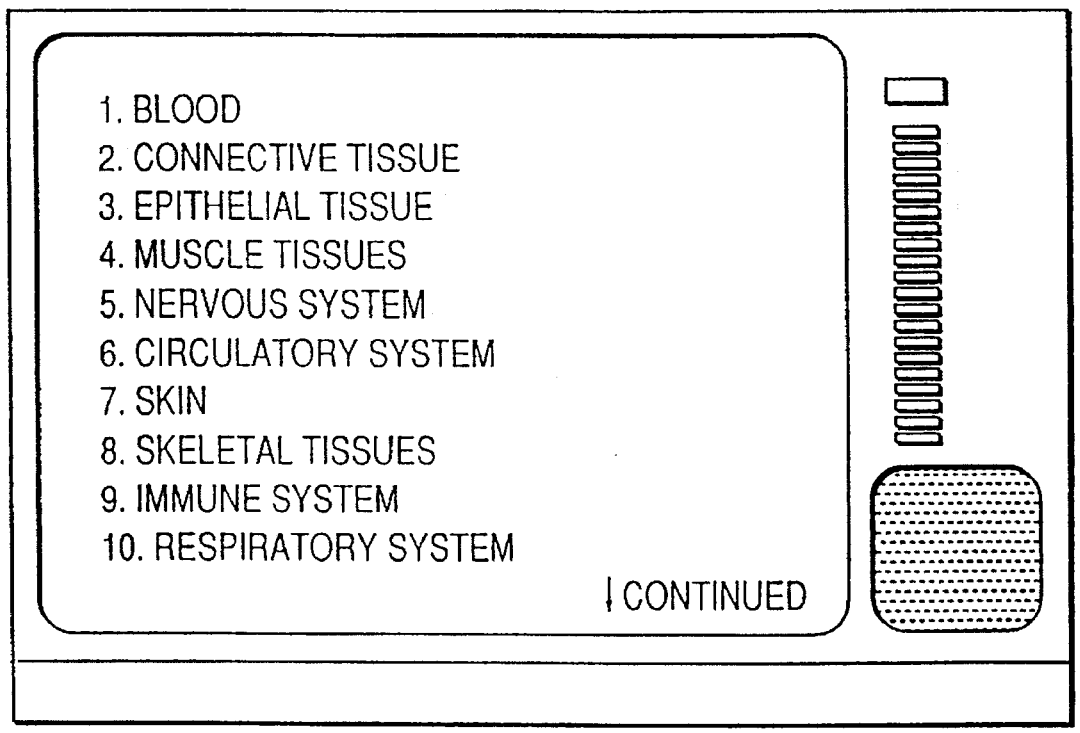
FIG. 15 shows a Table of Contents screen for a prerecorded video tape that serves as a companion to a textbook.
Figure 7A:
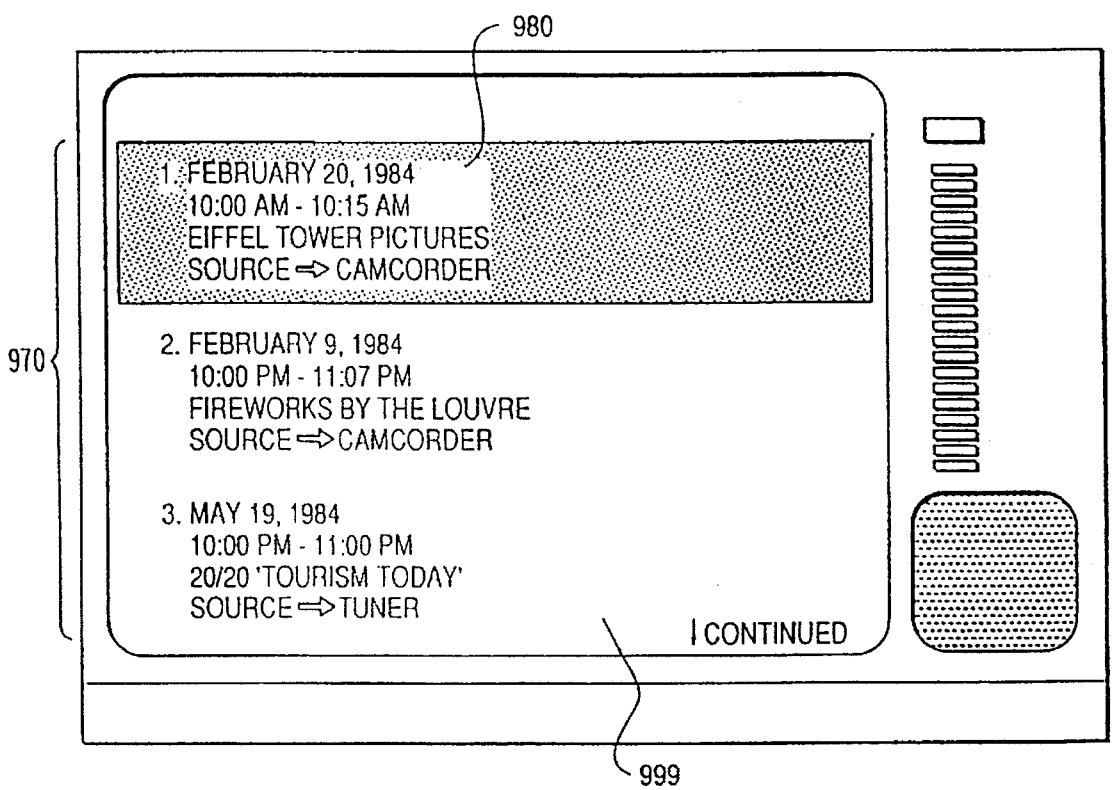
FIG. 7 shows an example of a "Go To Program by Title" capability of a VCR in accordance with one embodiment of the present invention.
Figure 7B:
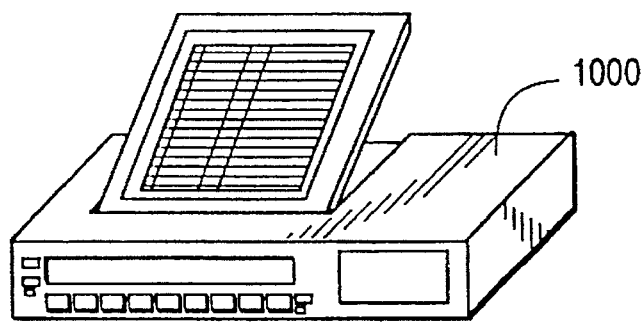
Figure 7C:
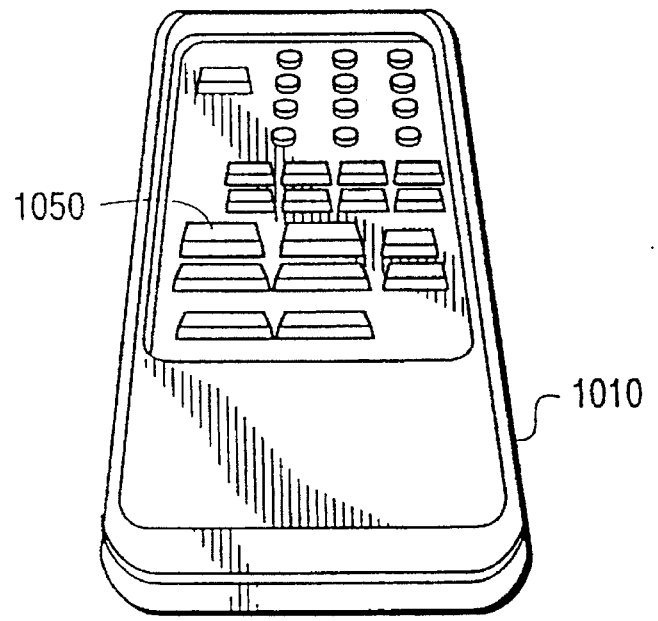
Figure 7D:
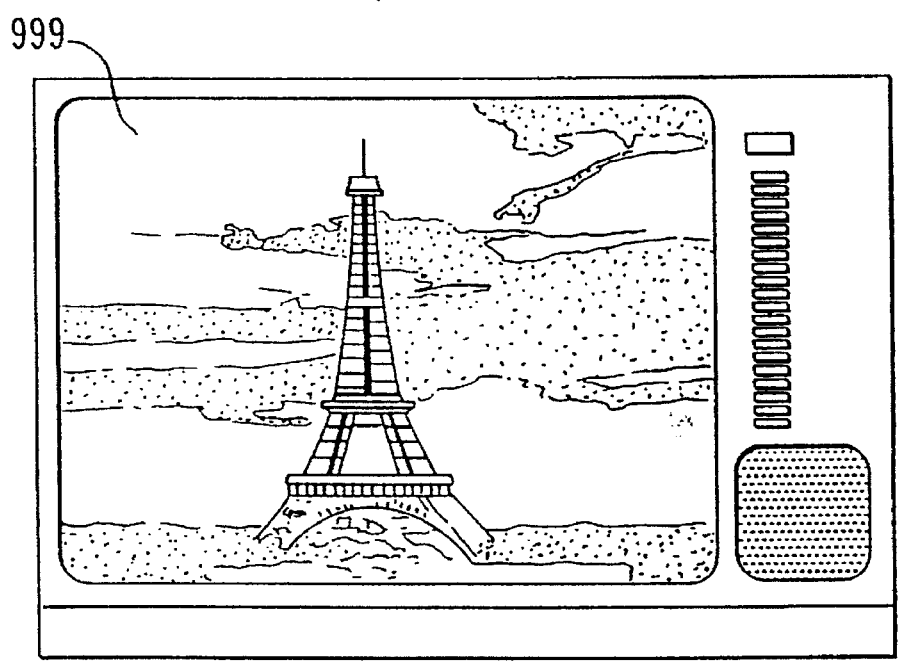

FIG. 15 represents a Table of Contents screen of a video tape that serves as a companion to a textbook.

Figure 16A:
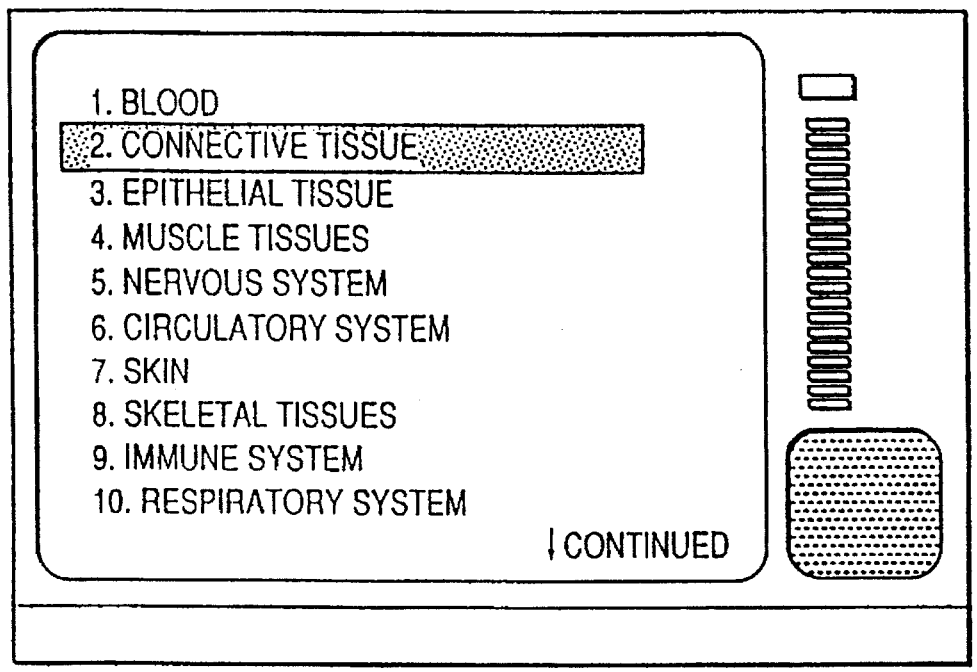
FIGS. 16A and B shows a preview frame in accordance with one embodiment of the present invention.
Figure 16B:
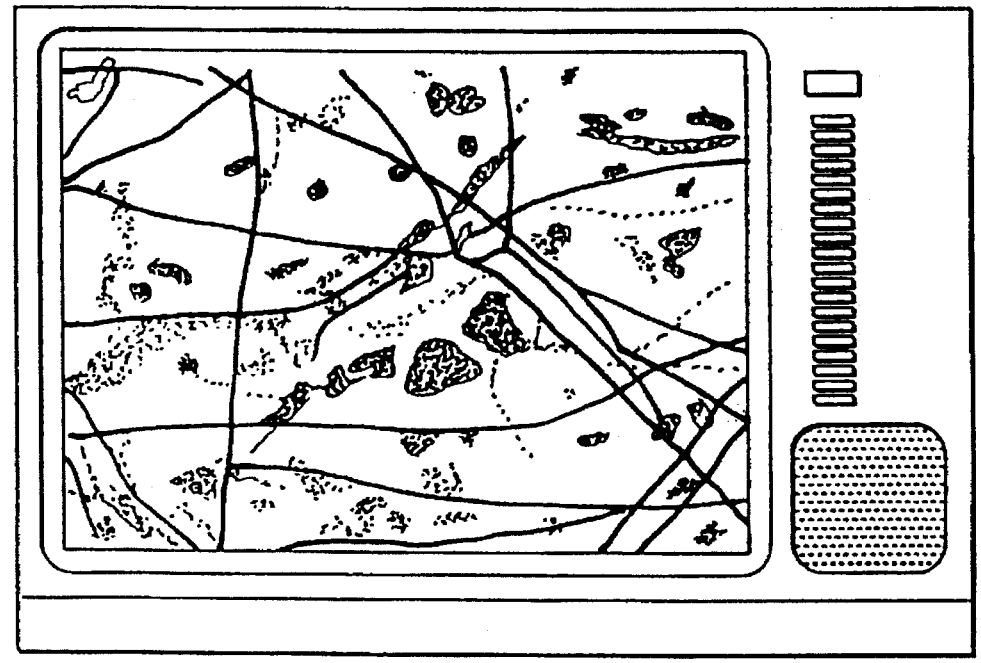

FIG. 16 illustrates the concept of the preview frame. FIG. 16A illustrates a television screen displaying the Table of Contents of a video tape that serves as an instructional companion to a textbook. As shown in FIG. 16A, Chapter Two on "Connective Tissue" has been selected by a viewer. Concurrent with the selection of Chapter Two, one or more pictorial "previews" of scenes appearing in the chosen chapter may be displayed on the monitor. FIG. 16B depicts one frame showing elastin fibers which are found in one of the types of connective tissue covered in Chapter Two. The preview frames may be retained in an auxiliary memory in digital form, although this is not a requirement. With pre-recorded tapes, preview frames may be supplied by the manufacturer of the tape in an auxiliary memory.

Figure 17A:
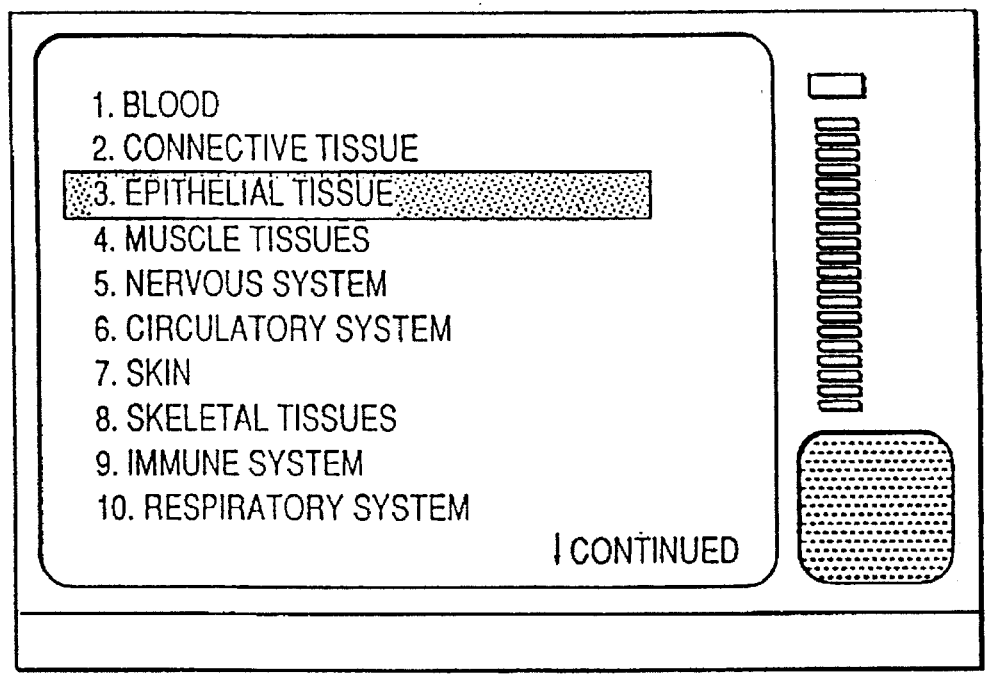
FIGS. 17A and B shows another preview frame in accordance with one embodiment of the present invention.
Figure 17B:
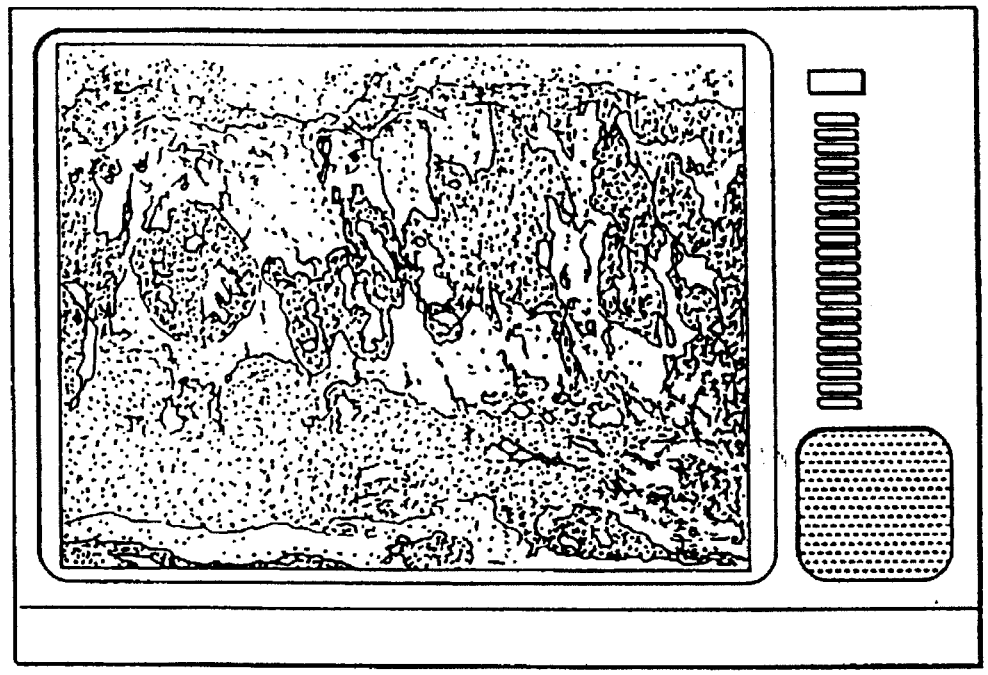

FIG. 17 contains another example of a preview frame. As illustrated in FIG. 17A, the chapter on "Epithelial Tissue" has been selected. As illustrated in FIG. 17B ciliated, columnar epithelium is being displayed on the television screen. The present invention is not limited to a single preview frame, but may offer a multiple number of such frames, with the limitation arising from the size of available memory.

Also enabled by an embodiment of the present invention may be a "video synopsis" in which pictorial review information may be presented to the viewer in a user-controllable fashion either before or after a program.

FIG. 18 illustrates the use of command instructions stored in an auxiliary memory to operate a VCR in accordance with an embodiment of the present invention. Virtually any instruction used to control the operation of a VCR can be stored in an auxiliary memory. Not only can the recording of programs be automated, as with prior art systems, but both the recording and the playback of programs, as well as the specific mode of recording and playback. In fact, any function that may be executable by an operator can be made automatically executable. This may be accomplished by placing machine state controller code in Auto-Run files in the auxiliary memory.

Figure 18A:
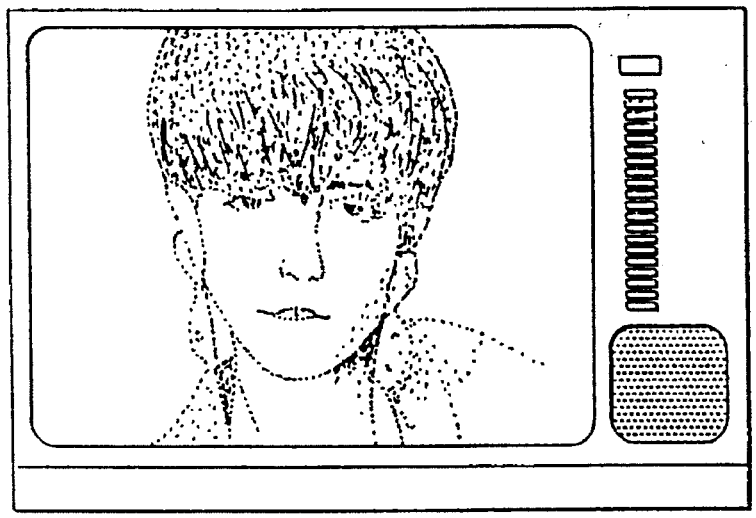
FIGS. 18A–18C shows the use of command instructions stored in an auxiliary memory to operate a VCR in accordance with one embodiment of the present invention.
Figure 18B:
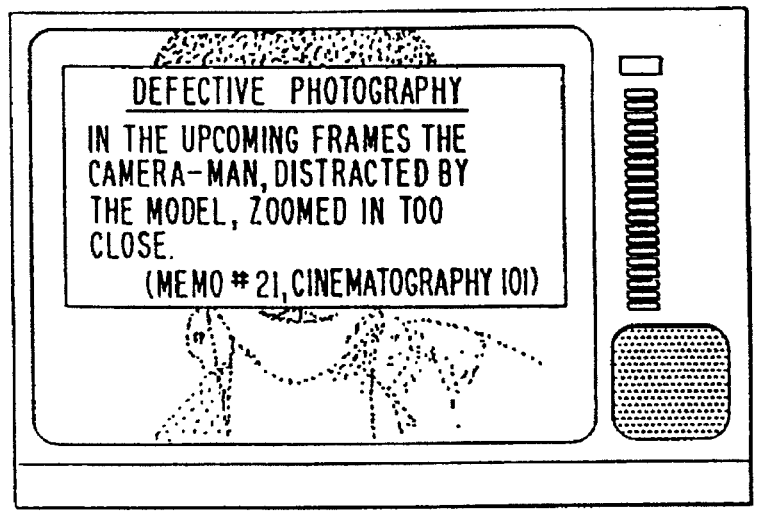
Figure 18C:
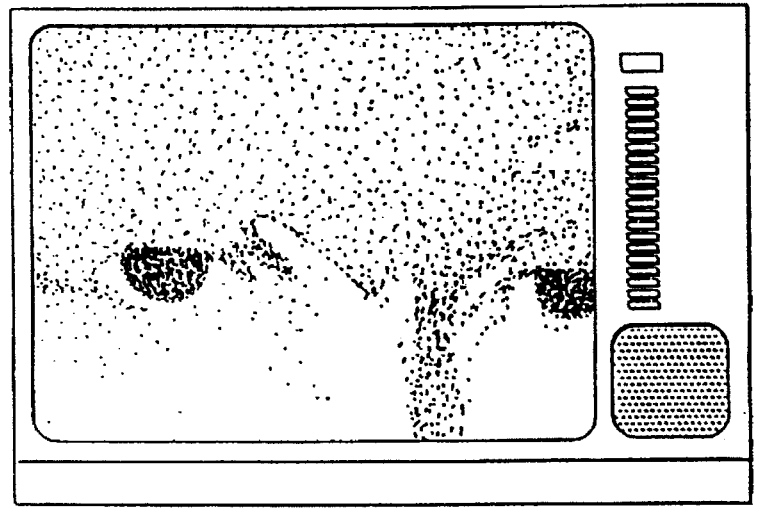
Figure 19A:
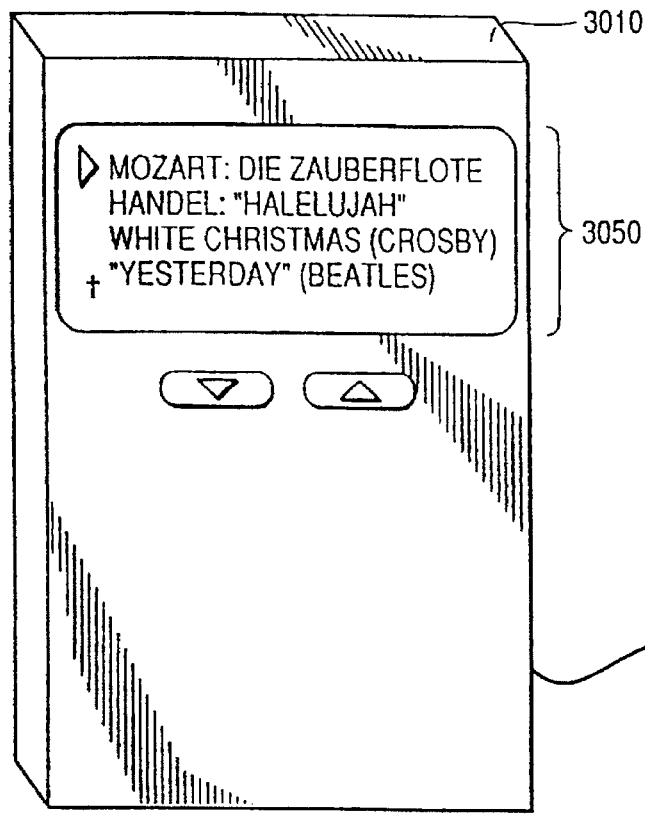
FIG. 19 shows the use of an auxiliary memory with a personal stereo in accordance with one embodiment of the present invention.
Figure 19B:
Figure 19C:
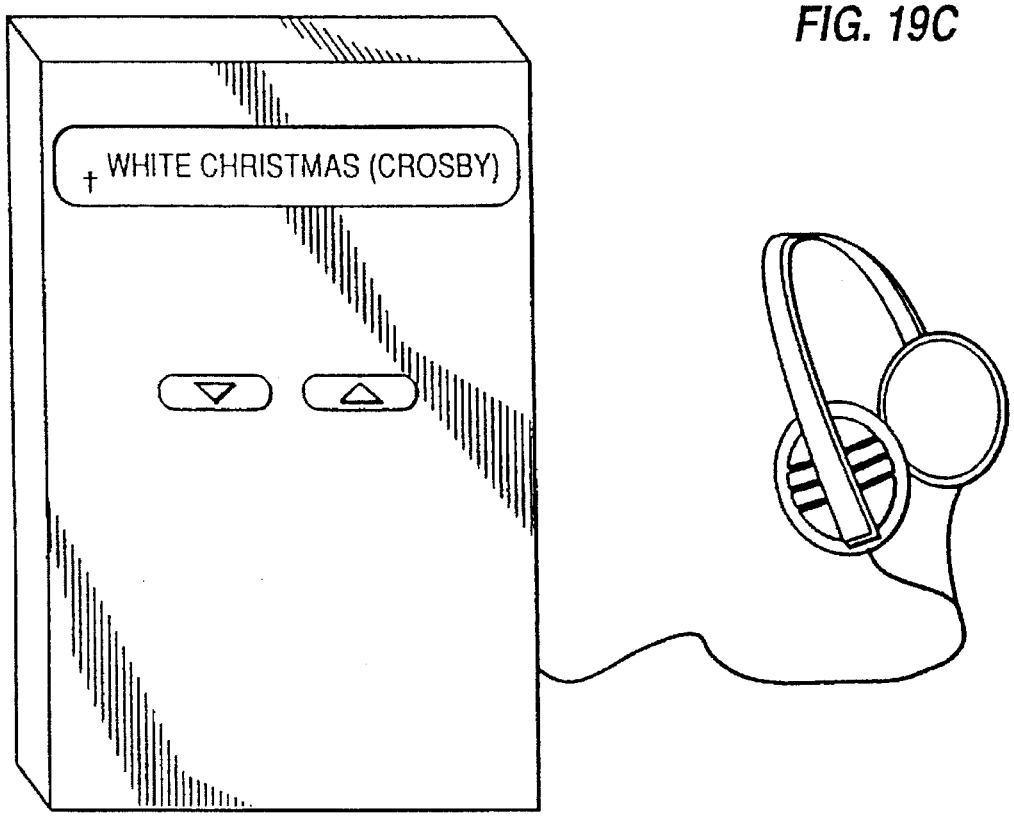
Figure 19D:
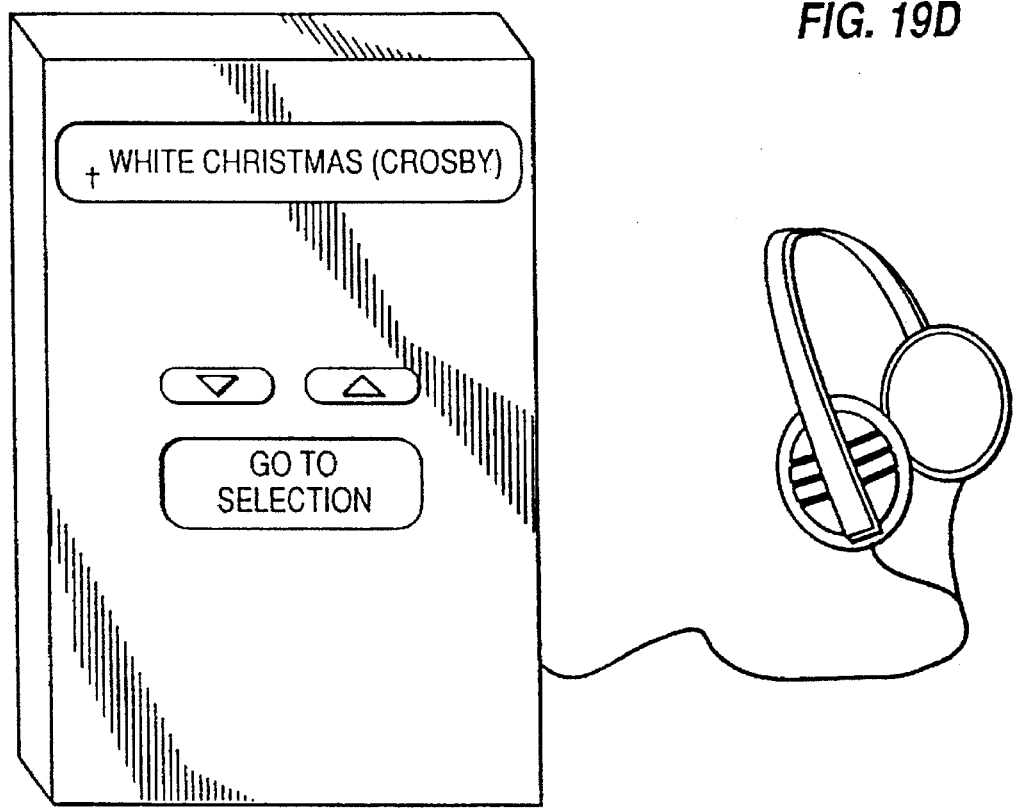

FIG. 18 illustrates an instructional video tape on cinematography. In FIG. 18A a subject appears as part of the instructional program. In FIG. 18B the video tape has gone into an automatic, pre-programmed freeze-frame, and a pop-up box appears on the screen with a tutorial message. FIG. 18C depicts resumption of the video program with the consequences forewarned in the pop-up box, namely a blurred, unintentional close-up shot. Slow motion play, accelerated play, fast forward without play, freeze frame, loop-segment play, frame-by-frame loop-segment play, etc. may all be incorporated into an automatic run routine. Captions, pop-up messages, etc. may also be present. Because of the wealth of executable commands that can be placed into auto-run routines, a means may be provided to enable ordinary users to execute such commands without being in possession of special programming skills. A command-capture facility may be available to serve as a "command stenographer" that automatically records command sequences issued by the user. The user merely executes the commands desired while, for instance, viewing the monitor and the actual command sequence may be automatically recorded.

FIG. 19 illustrates the use of an auxiliary memory in conjunction with a personal stereo or Walkman-type stereo 3010. The auxiliary memory may be of a magnetic variety, an optical variety, a semiconductor variety, etc., as in the previous examples. The present invention enables a prerecorded audio cassette to contain a complete listing 3050 of titles of songs included. A user can play a random selection of the songs the user desires to hear in any sequence. Bias and equalization can also be set automatically by the unit, upon retrieval of the technical specifications of the cassette tape from the cassette's auxiliary memory.

An apparatus in accordance with a preferred embodiment of the present invention may have the capability of performing a wide variety of functions. Some of these functions are described in greater detail below:

"AUTO-OVERWRITE"

Programs recorded on video tape typically have dates associated with them. Usually the date associated with the recorded program will be the date on which the recording was made. The auto-overwrite feature enables a video tape containing old and unwanted programs to be conveniently recycled. The user may set an "overwrite criteria", such as a "cutoff date". An example of an auto-overwrite operation might be: "erase all programs recorded before November 1st". The VCR automatically identifies programs fitting the "overwrite criteria" by performing a search on the table of contents information, and will make use of the program space occupied by the located recordings for the recording of new material.

Programs can be tagged not only by date but also by other identifiers, such as the name of the program or the category of the program (i.e., categories can be labels such as "educational", "science fiction", "news", etc.). Entire categories may be tagged for over-recording. For example, "recycle all news recordings."

"Mixed identifiers" are also possible. An example of a mixed identifier would be: "recycle all news programs recorded before November 1."

When a program is tagged for over-recording, only the Table of Contents information stored in the auxiliary memory of the videocassette need be altered. The actual program on the video tape need not be modified. However, once a program has been marked for over-recording it becomes susceptible to being overwritten by a new program. An "UNMARK" feature may be provided to cancel an overwrite status of a tagged program.

"SELECTIVE ERASURE"

Sometimes a user may have reason to erase a specific program on a video tape. The term "Erasure" as used herein refers to the actual magnetic removal of the program from the video tape, not merely the making available of the program space occupied by the program for new recordings. The selective erasure feature enables a user to magnetically remove a program from the video tape. The program to be erased may be selected from the on-screen Table of Contents. Erasure can take place either immediately after the program to be erased has been selected, or, it can be set to occur at a later time, such as when the VCR is known to be idle.

"SELECTIVE WRITE PROTECT"

From the table of contents, individual programs may be selected for write protection. Once a program has been write protected, it cannot be accidentally erased. It is not necessary to record a program and then write protect it in two separate steps. The "auto-protect on record" feature permits a program to be protected from erasure from the moment it is recorded, whether the recording was initiated manually, or by the VCR in accordance with a preset program. An "Emergency Override" feature may be also supported so that a write protected program can be over-recorded without first being unprotected. A warning may be issued on the monitor that protected material will be destroyed, and confirmation may be requested from the user. When an "Emergency Override" recording is in progress, and when the segment of video tape immediately following the current segment is also write-protected, a warning may be issued prior to the end of the current segment. The user must authorize the VCR to over-record on that next segment also. If authorization is not supplied to the VCR, the recording will terminate at the end of the current segment.

"AUTOMATIC DATA COMPARISON FEATURE"

The VCR and the videocassette are capable of comparing recording parameters with one another. For instance, if a Recording Agenda appears in an auxiliary memory but does not appear in the VCR program memory, then the VCR can automatically extract the recording schedule from the video tape. Similarly, if a program appears in both the VCR program memory and the videocassette memory, and if there is a discrepancy in a recording variable such as the Time or Channel, any of numerous "Contention Protocols" can be invoked to resolve the problem. For example, the user might wish the VCR to base the recording on the more up to date of the two sets of instructions.

"RECORD SENTRY"

If the timer record setting on the VCR is turned off when a timed recording is meant to take place, the Record Sentry feature may allow the VCR to perform the recording anyway at the appropriate time. Recordings need not be missed because the user correctly set the VCR to record, only to forget to turn on the timer record switch.

"VIDEO TAPE TECHNICAL SPECIFICATIONS"

The auxiliary memory 50 of the videocassette can contain the technical specifications of the video tape, such as its length, formulation, as well as any other information that may be required in order to make optimum usage of a given video tape. This may be especially useful for audio video tapes where it may be necessary to adjust the bias and equalization depending on the tape formulation. By reading the tape specifications from the auxiliary memory 50 of the videocassette mechanism, the recording unit can automatically make the appropriate settings.

"AVAILABLE TAPE REPORT"

A report may be furnished at any time, displayable on the video monitor, that shows the amount of tape available for recording. With the apparatus of the present invention, the composition of available tape may be somewhat more sophisticated than with current art machines. With current art machines, available tape may be simply the amount of tape remaining from the present tape position to the end of the "reel". With the present invention, available tape includes all segments of tape that can be recorded on, regardless of their location relative to the present tape position. For example, available tape can be comprised of runs of blanktape plus segments of tape that have been previously tagged for over-recording. Available tape is thus not merely tape that has not yet been recorded on, nor is it the amount of tape remaining on the spool from the present location to the end of the reel. Write-protected segments present themselves as debit items to the Available Tape Report, since they are not accessible for recording.

The total length of available tape after a tape has been used can be continuous or broken. Most often the total available stretch of tape may be comprised of broken segments. For example, there may be one-half hour "here", and two hours "there", for a total of two-and-a-half hours that should be used as two rather than one recording segment.

"JUMP RECORDING"

Jump Recording enables a set of discontinuous segments of tape to be collectively used as a single, continuous piece. The price for this in most embodiments, however, may be that brief moments of a recorded program will be lost in the process. While the fragmented viewing of a recorded program may be unpleasant to most viewers, it may be still often preferable that a program be recorded in this manner than with substantial portions absent on account of insufficient tape. In Jump Recording, the VCR may be instructed to use two or more non-consecutive segments of tape to record a single program. From an on-screen menu, the user selects the segments of tape to be spliced together. For instance, a single 2.5 hour program might be recorded on a combined stretch of one two hour segment and one one-half hour segment. Indexing instructions for use by the VCR in reconstructing the total program out of its constituent fragments may be recorded in either the auxiliary memory 50 of the videocassette, or on the tape itself. Automatic playback jumping permits playback of a jump-recorded program. Additionally, a jump-recorded program can be reconstructed onto a single, continuous stretch of tape by reconstructive duplication onto a second VCR.

With the arrival of techniques permitting auto-advertisement-editing, the jump recording can be coordinated by the VCR to occur during a commercial break so as to minimize program loss.

"AUTO-SPLICE-DUPLICATION"

Non-contiguous segments of tape can be manually tagged by the user for an automatic "splice together" by the VCR onto a second tape. The "auto-splicing" process can be programmed to occur at a convenient hour, such as late at night. "Auto-Splice-Duplication" may be applicable in many circumstances, including situations arising from timed recordings where one or more programs have become "inserted" between two consecutive episodes of the same program, because of the temporal alignment of the programs during broadcast.

"FUNCTION BLOCK WITH PASS CODE"

Specific programs may be selected by the user to be blocked from un-authorized viewing, erasure, over-recording, duplication, or other forms of manipulation. When programs are blocked from general access, a pass code must be supplied by a user. An "Auto-Play Mode Block, From Record" feature may be also supported so that a program, upon completion of recording, may be immediately play mode blocked. Parents may wish to employ this feature at the time a recording is made (so that they won't forget later) to insure that children do not view recorded material of unsuitable nature.

"RECORD MODE BLOCK"

Specific channels, Channel/Time combinations, program titles, or even mere times may be blocked so that recording cannot take place without authorization. This capability enables objectional programs to be precluded from taping by unauthorized individuals, such as children.

"GLOBAL COMMAND BLOCK"

With this variety of function block none of the features of the tape may be accessed or altered, including programmability, duplication, data inspection, etc.

"PROGRAM TAG FOR DUPLICATION"

Selected programs can be tagged for duplication from the Table of Contents. A time is selected for the duplication process to begin. The first VCR may be connected to a second one, with the second VCR programmed to commence recording from the agreed upon line input at the agreed upon time. At the appointed time the first VCR will begin playing the programs selected for duplication, and the second VCR will begin recording the output of the first unit so that the selected programs are copied by the second machine onto the second video tape.

"TAG AS EXPENDABLE"

Programs can be tagged on a scale of expendability, where the more expendable programs are recyclable regardless of their write-protect status. For example, on a scale of 1–5, a "5" might be first to go if a recording of unknown length such as a live broadcast needs more time. When available tape such as blank segments run out, the vcr automatically finds and jumps to expendable segments and overwrites them with the new material.

"PROGRAM CATALOGUE"

For purposes of labelling entire videocassettes, it may be possible to assign a name, a number, or both to a videocassette. Further, to the extent of available memory, a list of all of the tapes in a (small) library of tapes can be included on each tape. A computer-type storage means may be better suited for this purpose if there are many tapes in the tape library.

"COMPANION DATA"

The presentation of video material often requires the accompaniment of another body of material, such as a textual preface or commentary. This may be especially true with pre-recorded material such as rented movies. Copyright information is usually displayed at the beginning of the movie. At present, the copyright notice and duplication warning are recorded on the videotape. In accordance with the present invention, it may be possible to maintain such information as well as other more elaborate forms of information in the auxiliary memory 50 of the videocassette, rather than on the video tape itself. Explanations of the AMPAS movie rating system might be provided. Synopses, explanatory information, as well as commentaries can be furnished to accompany a pre-recorded tape. For example, if a tape contains a Shakespeare play, a "Monarch Note" type system of summaries and explanations can accompany the tape. A glossary of "Old English" words and phrases can even be supplied.

"POP-UP INFORMATION"

A video program can be electronically marked at specific points along the playing length for freeze frame and pop-up explanations, where the pop-up material may be supplied from the auxiliary memory 50 of the videocassette. This may be useful for instructional video where explanations can be offered or questions can be posed for viewers to consider. Automatic freeze frame with pop-up screens permit programmed interruptions to take place, in the absence of an instructor of lecturer.

"INTERACTIVE VIDEO TAPE"

With a more comprehensive instruction set that includes commands to control VCR operation, interactive video, although of a limited nature compared to that afforded by laser video disc, can be implemented. The program being played can ask viewers questions, the answers to which will determine what is subsequently viewed by the audience. This capability, as implemented by a VCR, might be appropriate for instructional programming in a number of situations. A VCR-based system might be more cost effective than a laser disc based system or computer based system, because the VCR system of the present invention is a multi-purpose machine.

"PASSAGE ID"

A tape can be viewed and specific passages can be marked along their length with identifying information. This capability may be useful in instructional video, tape used for courtroom exhibits, tapes containing passages for scientific investigation, etc.. It may be possible to list in the table of contents the comment associated with each marked passage and, by using the Go To feature, to jump to that location. An example might be: Go to "Solid rocket booster separation in the Challenger accident". From the on-screen Table of Contents, a user can then go to the point in the recording where a pre-identified "video passage" is present, and view that passage. Pre-recorded tapes may contain extensive Passage I.D. information in the Table of Contents. For example, a tape on the life of Frank Lloyd Wright might have I.D. listings of each of his designs discussed on tape. A viewer may thus jump to and view any selected project of Wright's.

Figure 20:
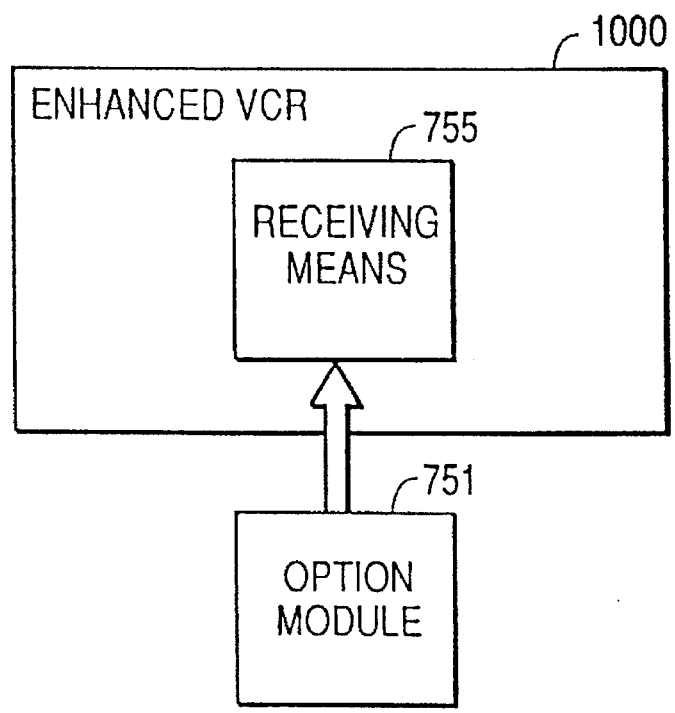
FIG. 20 shows expansion means.

Finally, FIG. 20 shows an example of expansion means for the present invention. Expansion means may be desirable to enable users to modify the functional capabilities of their equipment as the need arises, or as new technologies emerge. As an example, consider routine programming. It is anticipated that the procedure for programming VCR's may undergo improvements and modifications with the passage of time. In order to accommodate these improvements and modifications the VCR may preferably be equipped with flexible modification means. The modification means is preferably kept simple, so that ordinary users will be able to implement it. For example, an Option Module might be employed to enable the VCR to receive scheduling information over telephone lines. The VCR could be set, for instance, to call an electronic bulletin board at a convenient hour (such as late every evening) to retrieve program information for the following day. Complete schedules could be retrieved. Alternatively, on-line searches could be performed to find out when and on which channel a specific program will be telecast. It may also be possible for a VCR to automatically seek confirmations for anticipated broadcasts just before timed recordings are initiated. Further, with respect to telephonic data retrieval, the VCR could be equipped to "call-in" to calibrate its internal clock settings. DayLight Savings Time and power failures need no longer necessitate user intervention. On a parallel theme, the same or similar function module may permit the VCR to retrieve "On-Line" educational information from any of a number of already existing services. Similarly, an electronic newspaper may be implemented wherein news information may be automatically retrieved and recorded, perhaps early every morning, to serve as a companion or substitute for the morning paper. It may also be possible to retrieve only special interest news, such as financial reports.

The construction of an Option Module may depend on the function that the module is intended to provide. A module may include, as perhaps in the above example, a data modem and data compression/decompression means implemented in hardware (to enable "burst transmissions"). An additional purpose of the Option Module may be to provide a means for accommodating unanticipated future developments.

FIG. 20 illustrates the insertion of an exemplary Option Module 751 into a receiving means 755 of a VCR 1000 in accordance with an embodiment of the present invention. The Option Module may be provided with bus interface connectors as well as with audio and video connectors. The audio and video lines entering the Option Module may emanate from an A/V distribution amplifier. The audio and video lines exiting the Option Module may go to an A/V Mixer. In some embodiments, "bus mastering" design concepts may be used to enable multiple masters to reside simultaneously on the system. In such embodiments, the option modules may be bus master adapters. An advantage of such an embodiment is that any bus master adapter module may seize control of system resources from the default system master to become the temporary or new system master. The original system may thereby be essentially replaced by a new system, that may be entirely contained within one or more plug-in Option Modules, when the original system becomes obsolete.

The presently disclosed embodiment is therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A recording system comprising:
   a cassette;
   a primary memory associated with the cassette;
   an auxiliary memory removably mounted to the cassette;
   primary read/write means for sequentially reading information from and writing information to the primary memory;
   auxiliary read/write means for randomly reading information from and writing information to the auxiliary memory;
   a coordination memory fixedly associated with the cassette;
   means for writing coordination information to the auxiliary memory and the coordination memory;
   means for reading coordination information from the auxiliary memory and the coordination memory;
   means for comparing coordination information read from the auxiliary memory and the coordination memory;
   whereby removal of the auxiliary memory from the cassette after a program has been recorded on the primary memory may be determined.

2. The recording system of claim 1 further comprising a retainer for mounting said auxiliary memory to said cassette.

3. The recording system of claim 2 wherein said coordination memory is located on said retainer.

4. The recording system of claim 1 wherein said coordination information comprises a code common to said coordination memory and said auxiliary memory.

5. The recording system of claim 1 wherein said auxiliary memory is mounted to said cassette using a reversible adhesive backing.

6. A playback system comprising:
   a cassette;
   a primary memory associated with the cassette;
   an auxiliary memory removably mounted to the cassette;
   primary read means for sequentially reading information from the primary memory;
   auxiliary read means for randomly reading information from the auxiliary memory;
   a coordination memory fixedly associated with the cassette;
   means for reading coordination information from the auxiliary memory and the coordination memory;
   means for comparing coordination information read from the auxiliary memory and the coordination memory;
   whereby removal of the auxiliary memory from the cassette after a program has been recorded on the primary memory may be determined.

7. The playback system of claim 3 further comprising a retainer for mounting said auxiliary memory to said cassette.

8. The playback system of claim 7 wherein said coordination memory is located on said retainer.

9. The playback system of claim 6 wherein said coordination information comprises a code common to said coordination memory and said auxiliary memory.

10. The playback system of claim 6 wherein said auxiliary memory is mounted to said cassette using a reversible adhesive backing.

11. A method for recording information to a cassette comprising:

providing a cassette, providing primary memory associated with said cassette, providing an auxiliary memory removably mounted to said cassette, providing primary read/write means for sequentially reading information from and writing primary information to said primary memory, providing auxiliary read/write means for randomly reading auxiliary information from and writing auxiliary information associated with said primary information to said auxiliary memory, providing a coordination memory fixedly associated with the cassette, writing coordination information to said auxiliary memory and said coordination memory, and comparing coordination information read from the auxiliary memory and the coordination memory, whereby removal of the auxiliary memory from the cassette after a program has been recorded on the primary memory may be determined.

12. The method of claim 11 wherein said auxiliary memory is mounted in a retainer on said cassette.

13. The method of claim 12 wherein said coordination memory is located on said retainer.

14. A method for reading information from a cassette comprising:

providing a cassette, providing a primary memory associated with said cassette, providing an auxiliary memory removably mounted to said cassette, providing primary read means for sequentially reading primary information from said primary memory, providing auxiliary read means for randomly reading auxiliary information associated with said primary information from said auxiliary memory, providing a coordination memory fixedly associated with the cassette, reading coordination information from said auxiliary memory and said coordination memory, and comparing said coordination information read from said auxiliary memory and said coordination memory, whereby removal of said auxiliary memory from said cassette after a program has been recorded may be determined based on said comparison.

15. The method of claim 14 wherein said auxiliary memory is mounted in a retainer on said cassette.

16. The method of claim 15 wherein said coordination memory is located on said retainer.

* * * * *